(12) United States Patent
Takamatsuya et al.

(10) Patent No.: US 7,349,407 B1
(45) Date of Patent: Mar. 25, 2008

(54) PROTOCOL CONVERSION APPARATUS, COMMUNICATION APPARATUS, COMMUNICATION PROGRAM STORAGE MEDIUM, AND COMMUNICATION SYSTEM

(75) Inventors: Yoshihiro Takamatsuya, Kawasaki (JP); Takahiro Matsumura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/573,174

(22) Filed: May 19, 2000

(30) Foreign Application Priority Data

Sep. 30, 1999 (JP) ................................. 11-278205
Mar. 6, 2000 (JP) ............................. 2000-060530

(51) Int. Cl.
*H04L 12/28* (2006.01)
*H04L 12/56* (2006.01)

(52) U.S. Cl. .................... 370/395.5; 370/466; 370/469; 709/218; 709/242

(58) Field of Classification Search ................ 370/410, 370/464, 466, 467, 468, 475, 469, 476, 470, 370/477, 401, 395.5; 709/216, 217, 227, 709/230, 218, 242; 725/110
See application file for complete search history.

(56) References Cited

U.S. PATENT DOCUMENTS

| | | | |
|---|---|---|---|
| 5,430,727 A | | 7/1995 | Callon |
| 5,594,732 A | * | 1/1997 | Bell et al. .................... 370/401 |
| 5,832,222 A | * | 11/1998 | Dziadosz et al. ........... 709/216 |
| 5,864,559 A | * | 1/1999 | Jou et al. ..................... 370/465 |
| 5,864,680 A | * | 1/1999 | Edblad et al. .............. 709/242 |
| 5,978,386 A | | 11/1999 | Hämäläinen |
| 5,987,518 A | * | 11/1999 | Gotwald ..................... 709/230 |
| 6,215,772 B1 | * | 4/2001 | Verma ........................ 370/236 |
| 6,603,774 B1 | * | 8/2003 | Knappe et al. ............. 370/466 |
| 6,697,354 B1 | * | 2/2004 | Borella et al. .............. 370/352 |

FOREIGN PATENT DOCUMENTS

| | | |
|---|---|---|
| JP | 63-263945 | 10/1988 |
| JP | 11-252204 | 9/1999 |
| WO | WO 96/21983 | * 7/1996 |
| WO | WO 98/23054 | 5/1998 |
| WO | WO 98/30060 A1 | 7/1998 |

\* cited by examiner

*Primary Examiner*—Jean Gelin
*Assistant Examiner*—Inder Pal Mehra
(74) *Attorney, Agent, or Firm*—Staas & Halsey LLP

(57) ABSTRACT

A protocol conversion apparatus for converting a communication system (e.g. a USB scheme and a PDC scheme) is disposed between for example, a personal computer (PC) and a portable telephone (MS). A radio protocol packet is covered with USB protocol header/footer in its entirety, or the USB protocol header/footer is removed simply to generate the radio protocol packet.

6 Claims, 18 Drawing Sheets

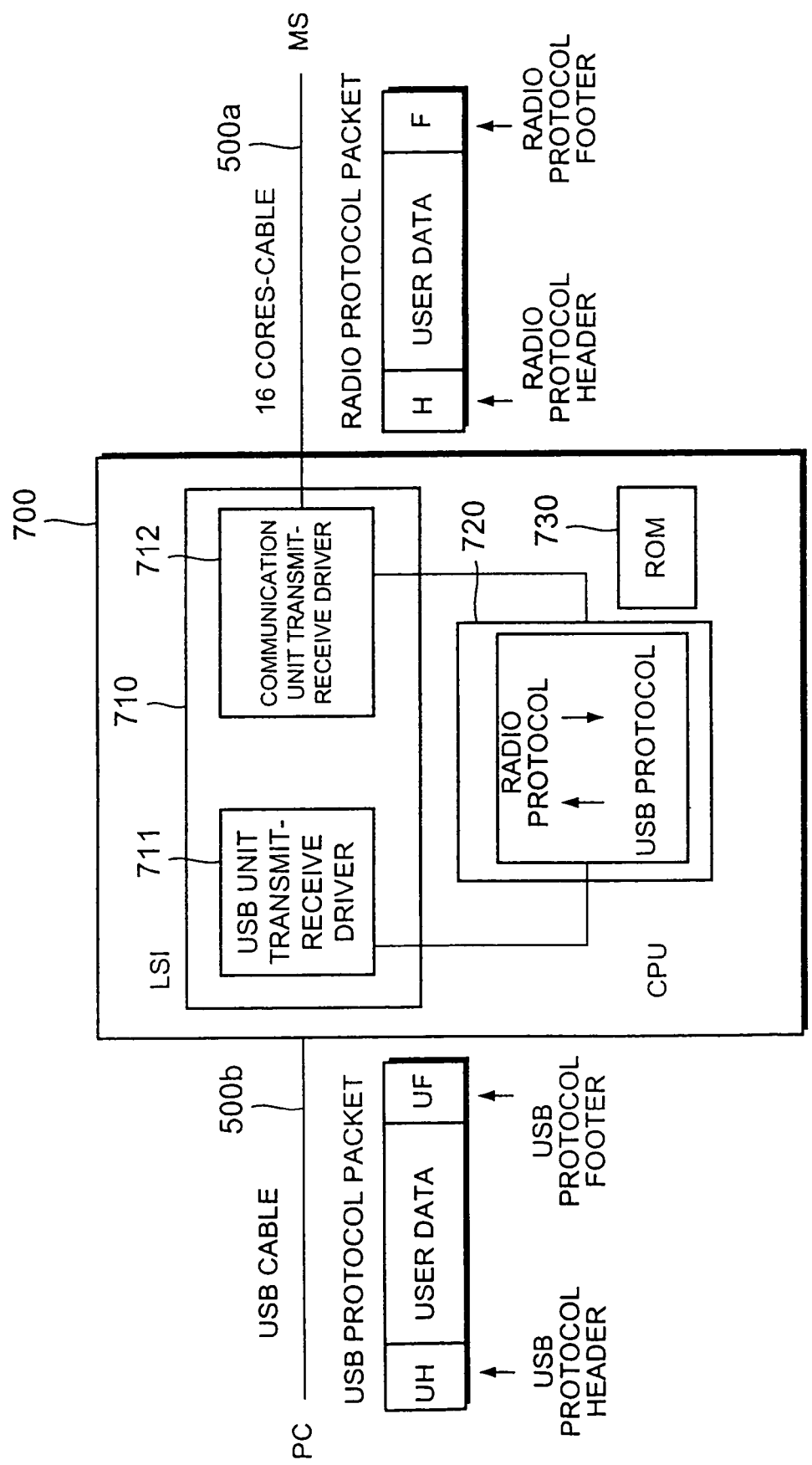

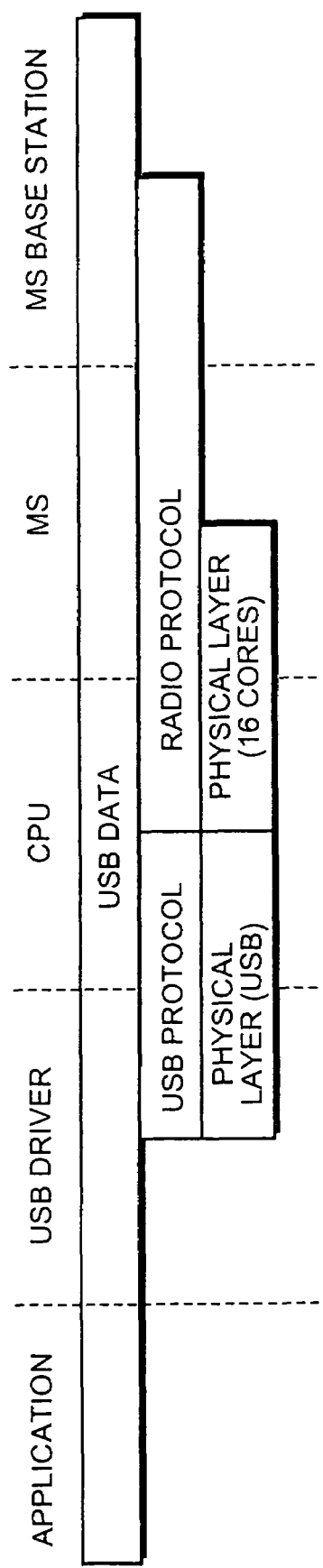

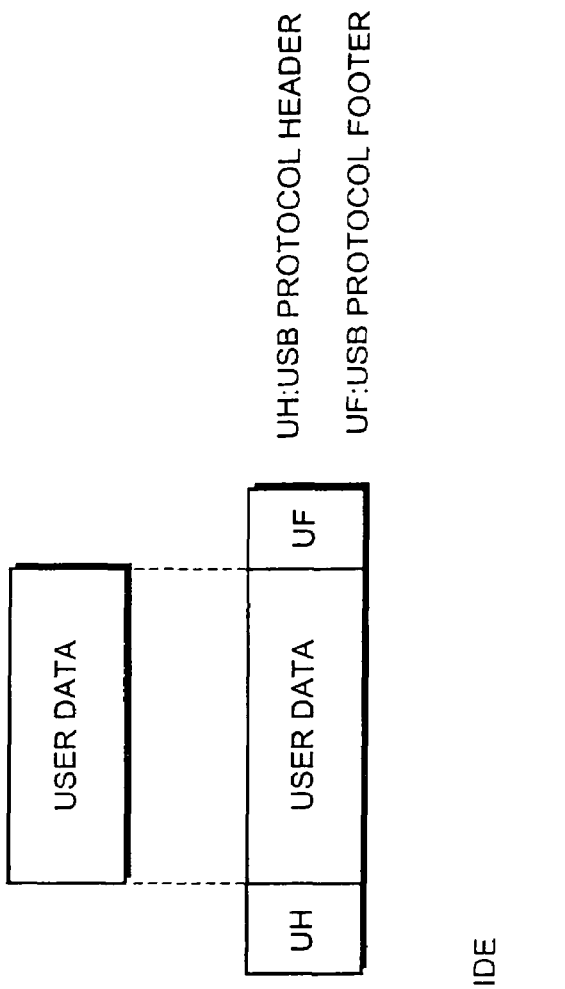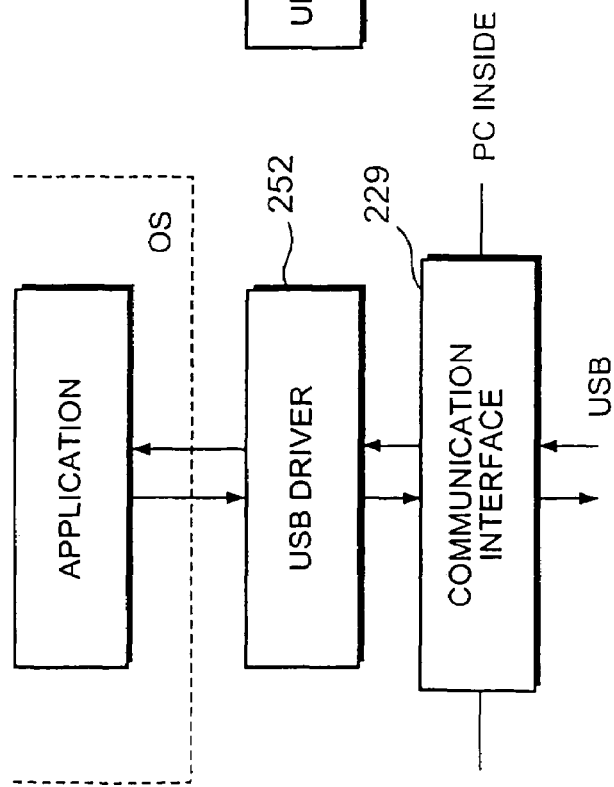

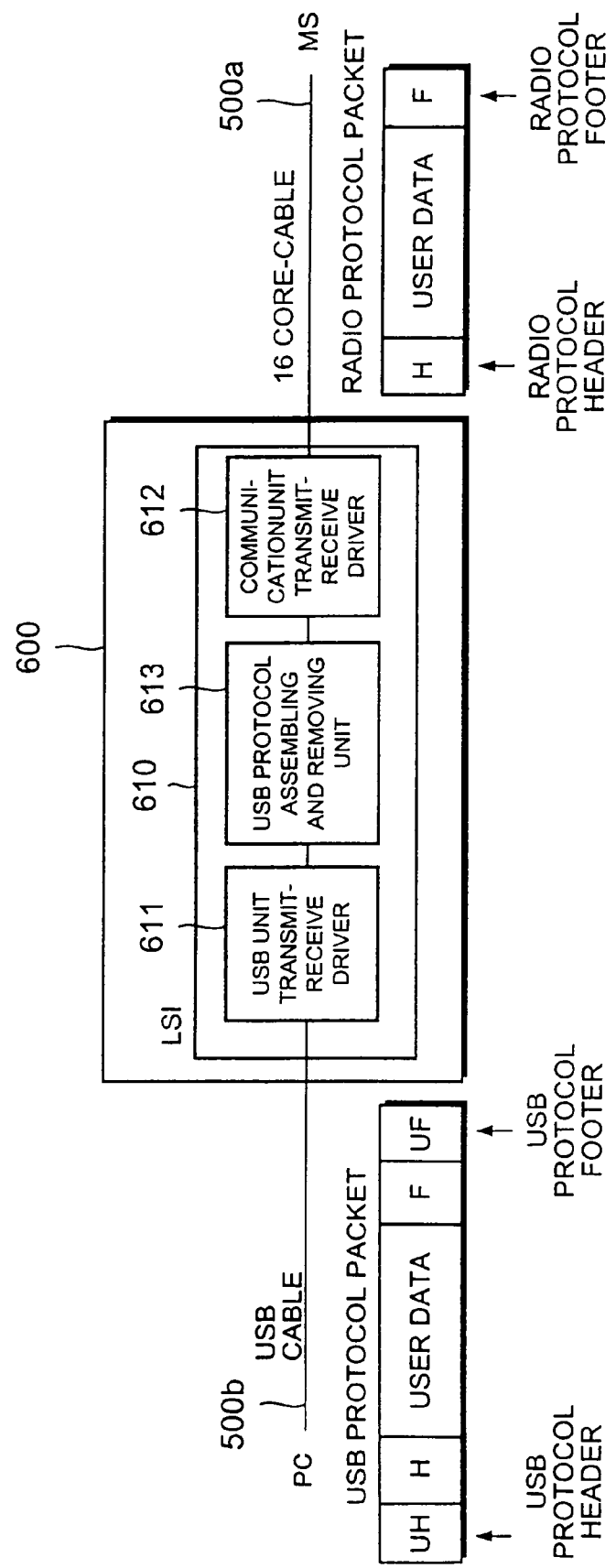

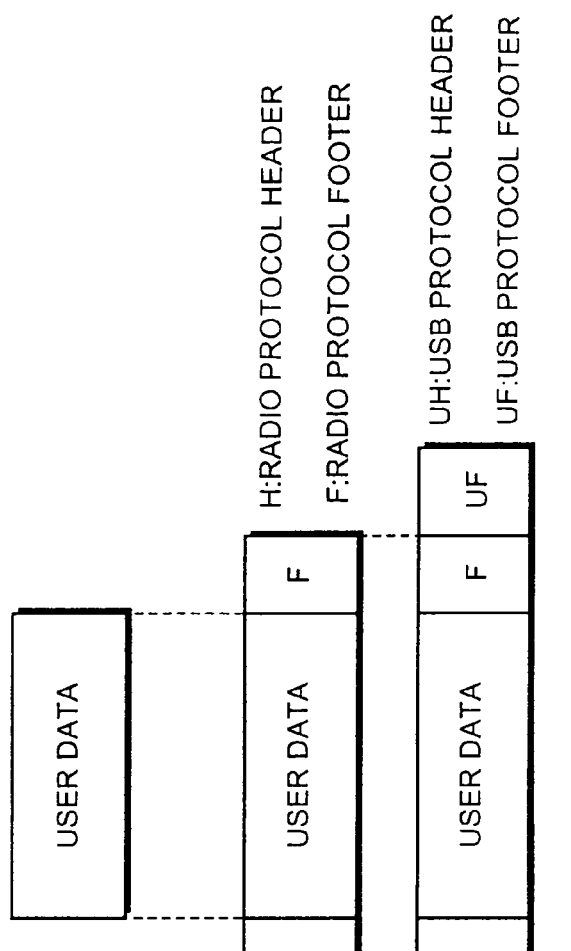
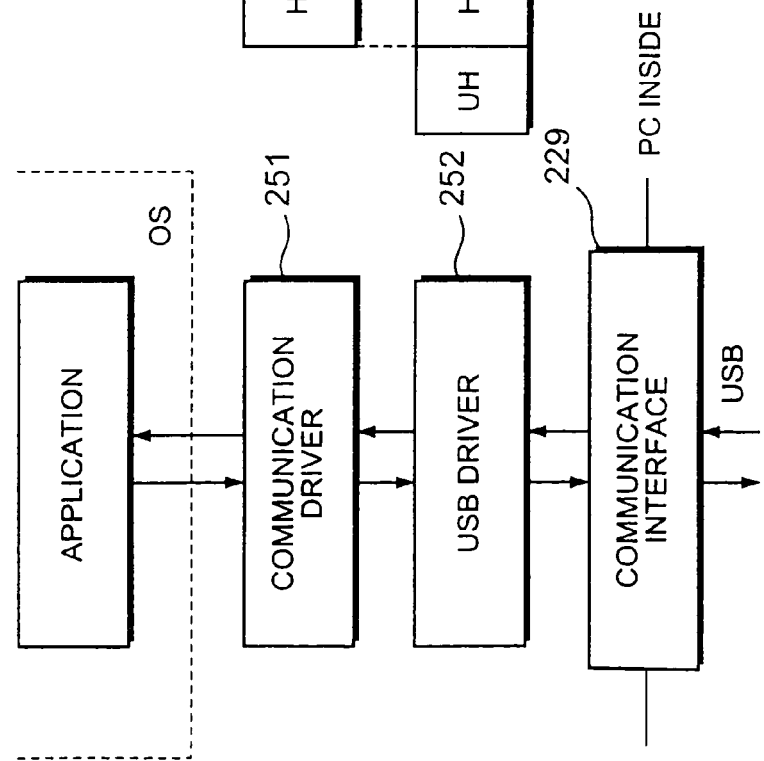

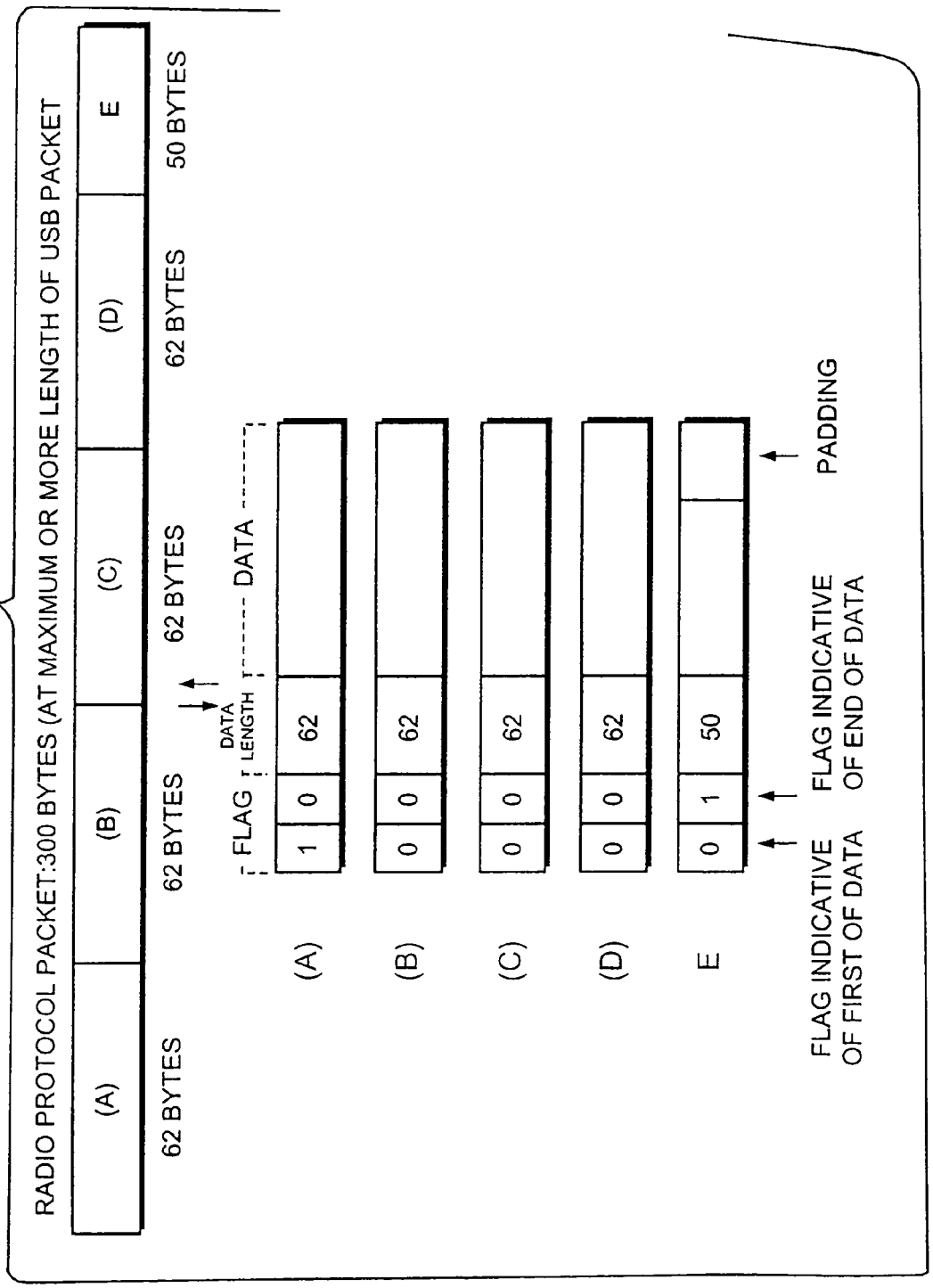

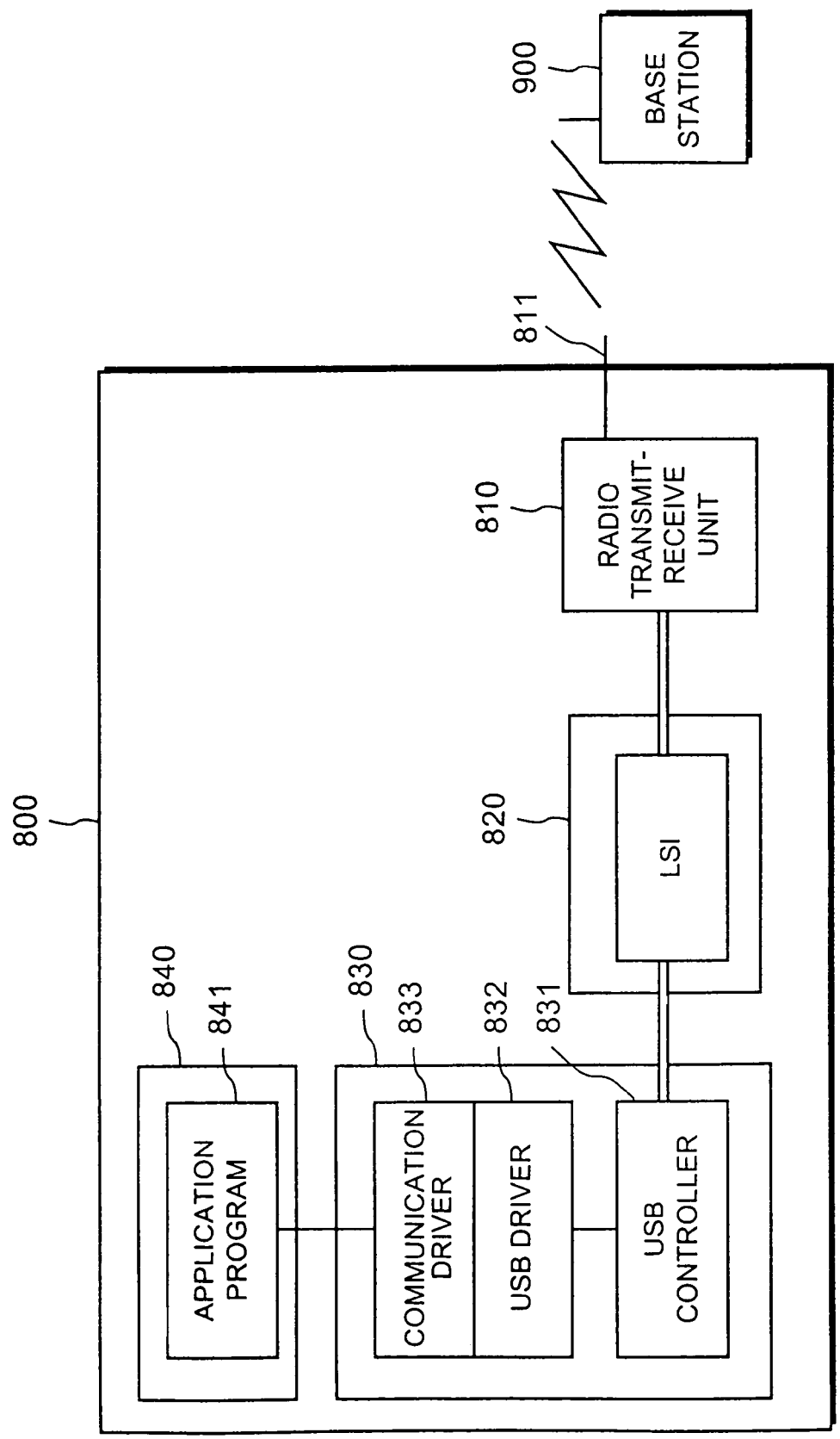

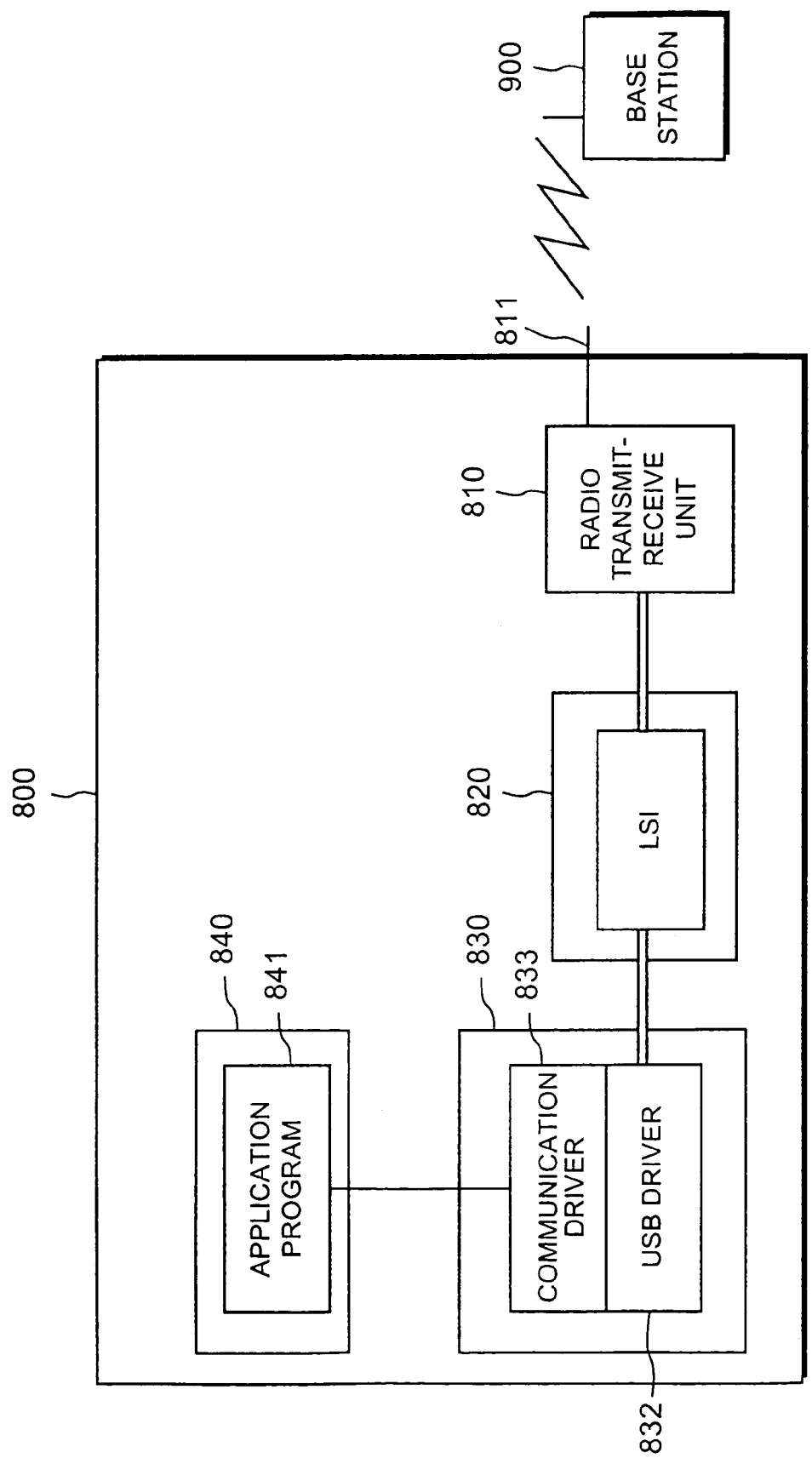

PROTOCOL CONVERSION APPARATUS, COMMUNICATION APPARATUS, COMMUNICATION PROGRAM STORAGE MEDIUM, AND COMMUNICATION SYSTEM

BACKGROUND OF THE INVENTION

1. Field of the Invention

The present invention relates to a protocol conversion apparatus for converting a protocol of a data packet transferred between two apparatuses, for example, a personal computer and a portable telephone, which are provided with mutually different communication forms in protocol, in a case where the portable telephone is connected to the personal computer to have a communication with the exterior, said protocol conversion apparatus being interposed between said two apparatuses; a communication apparatus for performing a communication with the exterior, said communication apparatus being suitable for said protocol conversion apparatus; a communication program storage medium storing a communication program to operate the computer as the communication apparatus; a communication system having a function of performing a communication with the exterior while performing a protocol conversion; and a communication apparatus for performing a communication with the exterior, said communication apparatus having a function of the protocol conversion apparatus.

2. Description of the Related Art

Hitherto, there is well known a system for performing a communication between apparatuses. In such a system, in the event that those apparatuses have communication forms which are mutually different in protocol, it happens that a protocol conversion apparatus is interposed between those apparatuses. Now, let us consider, for example, a case where a communication is performed between a personal computer and a portable telephone. A communication according to radio is performed between the portable telephone and the third apparatus other than the personal computer. Here, let us consider a case where data is transmitted from the personal computer to the portable telephone, or data is transmitted from the portable telephone, which receives data from the exterior, to the personal computer.

In the portable telephone, a communication is performed in accordance with a communication protocol of PDC (Personal Digital Cellular) scheme by way of example. On the other hand, in the personal computer, a communication is performed in accordance with a communication protocol of USB (Universal Serial Bus) scheme by way of example. Thus, there is a need to dispose a protocol conversion apparatus between the personal computer and the portable telephone. The protocol conversion apparatus serves, in the that the personal computer is connected to the portable telephone to establish a communication system so that a radio communication is performed from the communication system to the exterior (the third apparatus), or data transmitted from the exterior on a radio basis is received, to convert a data packet having a data format based on a communication protocol of PDC scheme, which is obtained through reception by the portable telephone, into a data packet having a data format based on a communication protocol of USB scheme, which is capable of being dealt with by the personal computer, and also in the event that data generated or edited at the personal computer end is transmitted via the portable telephone to the exterior, to convert a data packet having the data format based on the communication protocol of USB scheme into the data packet having the data format based on the communication protocol of PDC scheme.

A data packet comprises user data, which is to be essentially transferred, and protocol data such as a header, a footer and the like, which is based on a communication protocol. In the protocol conversion apparatus, when the data packet based on a communication protocol of PDC scheme is transmitted from the portable telephone to the personal computer, the user data is picked up by means of removing the protocol data based on the communication protocol of PDC scheme, and a data packet based on the communication protocol of USB scheme is generated by means of applying the protocol data based on the communication protocol of USB scheme to the user data thus picked up, so that the data packet thus generated is transmitted to the personal computer.

On the other hand, in the protocol conversion apparatus, when the data packet based on a communication protocol of USB scheme is transmitted from the personal computer to the portable telephone, the user data is picked up by means of removing the protocol data based on the communication protocol of USB scheme, and a data packet based on the communication protocol of PDC scheme is generated by means of applying the protocol data based on the communication protocol of PDC scheme to the user data thus picked up, so that the data packet thus generated is transmitted to the portable telephone.

In this manner, a provision of the protocol conversion apparatus as mentioned above between two apparatuses wherein a communication is performed in accordance with individual communication protocols makes it possible to perform a communication between the apparatuses wherein a communication is performed in accordance with individual communication protocols.

Interposing the protocol conversion apparatus as mentioned above between two apparatuses makes it possible to perform a communication between even apparatuses wherein a communication is performed in accordance with mutually different communication protocols. However, according to the conventional protocol conversion apparatus, as mentioned above, the user data is picked up by means of removing the protocol data based on a communication protocol of one scheme from the data packet based on the one communication protocol, and a data packet based on the communication protocol of another scheme is generated by means of applying the protocol data based on the communication protocol of another scheme to the user data thus picked up. Such a conventional protocol conversion apparatus needs, however, a complicated processing. Usually, according to the conventional protocol conversion apparatus, there is a need to provide a hardware for performing a communication based on a communication protocol of one scheme, an additional hardware for performing a communication based on a communication protocol of another scheme, a CPU for converting the data packets received by those hardwares in a manner as described above, and a memory for storing a program to be executed by the CPU. This causes the apparatus to be complicated, and also the apparatus to be large-sized and to be expensive.

SUMMARY OF THE INVENTION

In view of the foregoing, it is an object of the present invention to provide a protocol conversion apparatus capable of contributing to miniaturization and cost-down of the apparatus; a communication apparatus suitable for said protocol conversion apparatus; a communication program storage medium storing a communication program to operate the computer as the communication apparatus; a communication system comprising the communication apparatus or the communication program storage medium, and the protocol conversion apparatus; and a communication apparatus having a function of the protocol conversion apparatus.

To achieve the above-mentioned objects, the present invention provides a protocol conversion apparatus comprising:

a first transmit-receive driver for transmitting and receiving a data packet based on a first communication standard, wherein protocol data based on the first communication standard is added to user data;

a second transmit-receive driver for transmitting and receiving a data packet based on a second communication standard, wherein protocol data based on the second communication standard is added to user data; and a protocol assembling and removing unit for providing such a process that the data packet based on the first communication standard, which is received by said first transmit-receive driver, is received and the protocol data based on the second communication standard is added to the received data packet to generate the data packet based on the second communication standard, and the generated data packet is transferred to said second transmit-receive driver for transmit-receive from said second transmit-receive driver, and further the data packet based on the second communication standard, which is received by said second transmit-receive driver, wherein the protocol data based on the first communication standard is added to the user data and in addition the protocol data based on the second communication standard is added, is received and the protocol data based on the second communication standard is removed from the received data packet to derive the data packet based on the first communication standard, wherein the protocol data based on the first communication standard is added to the user data, and the derived data packet is transferred to said first transmit-receive driver for transmit-receive from said first transmit-receive driver.

According to the protocol conversion apparatus of the present invention as mentioned above, protocol data based on the second communication standard is merely added or removed with respect to a data packet, but applying and removal of protocol data based on the first communication standard are not performed. Thus, this feature makes it possible to greatly contribute to a miniaturization of the apparatus and a cost-down.

In the protocol conversion apparatus as mentioned above, it is preferable that the protocol conversion apparatus further comprises a standard setting unit for setting up a type of communication standard selected among from a plurality of types of communication standards, and said first transmit-receive driver transmits and receives the data packet based on the first communication standard, wherein the protocol data based on the first communication standard, which is set up by said standard setting unit, is added to the user data.

This feature makes it possible to enhance a general-purpose properties.

In the protocol conversion apparatus as mentioned above, it is acceptable that said standard setting unit has a register for storing set up standard data indicative of a communication standard to be set up, and the data packet, which is received by said second transmit-receive driver, wherein the protocol data based on the second communication standard is added to the set up standard data, is received and the set up standard data is derived from the received data packet so as to be set up onto said register. Alternatively it is acceptable that said standard setting unit sets up a communication standard in accordance with a signal set by the protocol conversion apparatus per se, and said second transmit-receive driver transmits a data packet in which the protocol data based on the second communication standard is added to the set up standard data indicative of the communication standard set by said standard setting unit.

In any cases, it is possible to have in common information as to a communication standard (the first communication standard) of the first transmit-receive driver between second transmit-receive driver and a communication apparatus of the party to perform a communication with the second transmit-receive driver.

Further, in the protocol conversion apparatus according to the present invention as mentioned above, it is preferable that said protocol assembling and removing unit provides such a process that in a case where the data packet received by said first transmit-receive driver exceeds a predetermined length, the data packet is divided into a plurality of sections to generate the data packet based on the second communication standard on each segment, and the data packet based on the first communication standard is reproduced from a plurality of data packets, which are received by said second transmit-receive driver, wherein respective segments in which the data packet based on the first communication standard is divided into a plurality of portions are given in form of user data.

This feature makes it possible to deal with data having a data length longer than the maximum length of a data packet capable of being dealt with in the second communication standard, without basically deforming a format of the data packet based on the first communication standard.

Further, to achieve the above-mentioned objects, the present invention provides a communication apparatus for performing a communication with an exterior, comprising:

first driver means for providing such a process that user data is received and protocol data based on a first communication standard is added to the received user data to generate a data packet based on the first communication standard, and a data packet, in which protocol data based on the first communication standard is added to user data, is received and the protocol data is removed from the received data packet to derive the user data;

second driver means for providing such a process that the data packet based on a first communication standard, which is generated by said first driver means, is received and in addition protocol data based on a second communication standard is added to the received data packet to generate a data packet based on the second communication standard, and a data packet based on the second communication standard, in which protocol data based on the second communication standard is added to a data packet based on the first communication standard in which data based on the first communication standard is added to user data, is received and the protocol data based on the second communication standard is removed from the received data packet to derive the data packet based on the first communication standard and then the derived data packet is transferred to said first driver means; and a communication unit for providing such a process that the data packet based on the second communication standard is received from said second driver means and the received data packet is transmitted to an exterior, and the data packet based on the second communication standard is received from the exterior and the received data packet is transmitted to said second driver means.

According to the communication apparatus of the present invention as mentioned above, interposing the protocol conversion apparatus of the present invention makes it possible to communicate with the exterior in a communication system based on the first communication standard.

In the communication apparatus of the present invention as mentioned above, it is preferable that said second driver means generates a data packet in which the protocol data based on the second communication standard is added to a set up standard data indicative of a type of communication standard selected among from a plurality of types of communication standards, and transfers the generated data packet to said communication unit.

In this case, the combination with the protocol conversion apparatus having the register for storing set up standard data as mentioned above makes it possible to have in common information as to the first communication standard between the communication apparatus and the protocol conversion apparatus.

Further, in the communication apparatus of the present invention as mentioned above, it is preferable that as said first driver means, there is provided a plurality of types of first driver means each associated with the first communication standard among from a plurality of types of communication standards, and said communication apparatus further comprises standard setting means for activating a first driver means according to the set up standard data indicative of a type of communication standard selected among from the plurality of types of communication standards, of said plurality of types of first driver means, received from the exterior.

In this case, the combination with such a type of protocol conversion apparatus that the first communication standard is set up in accordance with the signal set by the above-mentioned protocol conversion apparatus per se makes it possible to have in common information as to the first communication standard between the communication apparatus and the protocol conversion apparatus.

Furthermore, in the communication apparatus of the present invention as mentioned above, it is preferable that said second drive means provides such a process that in a case where the data packet based on said first communication standard, which is received from said first driver means, exceeds a predetermined length, the data packet is divided into a plurality of sections to generate the data packet based on the second communication standard on each segment and the generated data packet is transferred to said communication unit, and the data packet based on the first communication standard is reproduced from a plurality of data packets, which are received from said communication unit, wherein respective segments in which the data packet based on the first communication standard is divided into a plurality of portions are given in form of user data, and the reproduced data packet is transferred to said first driver means.

In this case, the combination with a protocol conversion apparatus, of the protocol conversion apparatuses of the present invention, having such a function that in a case where the data packet based on said first communication standard, which is received from said first driver means, exceeds a predetermined length, the data packet is divided into a plurality of sections to generate the data packet based on the second communication standard on each segment, and the data packet based on the first communication standard is reproduced from a plurality of data packets, which are received from said communication unit, wherein respective segments in which the data packet based on the first communication standard is divided into a plurality of portions are given in form of user data, makes it possible to transmit and receive even data having a data length longer than the maximum length of a data packet capable of being dealt with in the second communication standard which is the communication standard of the communication apparatus, through interposing the protocol conversion apparatus, in form of one data packet based on the first communication standard.

Furthermore, to achieve the above-mentioned objects, the present invention provides a communication program storage medium storing a communication program which causes a computer to operate as a communication apparatus for performing a communication with an exterior when the communication program is executed in the computer, wherein said communication program storage medium stores the communication program having:

first driver means for providing such a process that user data is received and protocol data based on a first communication standard is added to the received user data to generate a data packet based on the first communication standard, and a data packet, in which protocol data based on the first communication standard is added to user data, is received and the protocol data is removed from the received data packet to derive the user data; and second driver means for providing such a process that the data packet based on a first communication standard, which is generated by said first driver means, is received and in addition protocol data based on a second communication standard is added to the received data packet to generate a data packet based on the second communication standard, and a data packet based on the second communication standard, in which protocol data based on the second communication standard is added to a data packet based on the first communication standard in which data based on the first communication standard is added to user data, is received and the protocol data based on the second communication standard is removed from the received data packet to derive the data packet based on the first communication standard and then the derived data packet is transferred to said first driver means.

Execution of the communication program stored in the communication program of the present invention in a computer having the function of performing a communication based on the second communication standard makes it possible that the computer serves as the communication apparatus of the present invention.

Incidentally, the communication program stored in the communication program of the present invention includes all the ways associated with the various ways of the communication apparatus of the present invention as mentioned above.

To achieve the above-mentioned objects, the present invention provides a first communication system comprising:

a protocol conversion apparatus comprising:

a first transmit-receive driver for transmitting and receiving a data packet based on a first communication standard, wherein protocol data based on the first communication standard is added to user data;

a second transmit-receive driver for transmitting and receiving a data packet based on a second communication standard, wherein protocol data based on the second communication standard is added to user data; and a protocol assembling and removing unit for providing such a process that the data packet based on the first communication standard, which is received by said first transmit-receive driver, is received and the protocol data based on the second communication standard is added to the received data packet to generate the data packet based on the second communication standard, and the generated data packet is transferred to said second transmit-receive driver for transmit-receive from said second transmit-receive driver, and further the data packet based on the second communication standard, which is received by said second transmit-receive driver, wherein the protocol data based on the first communication standard is added to the user data and in addition the protocol data based on the second communication standard is added, is received and the protocol data based on the second communication standard is removed from the received data packet to derive the data packet based on the first communication standard, wherein the protocol data based on the first communication standard is added to the user data, and the derived data packet is transferred to said first transmit-receive driver for transmit-receive from said first transmit-receive driver; and a communication apparatus for performing a communication with an exterior, comprising:

first driver means for providing such a process that user data is received and protocol data based on a first communication standard is added to the received user data to generate a data packet based on the first communication standard, and a data packet, in which protocol data based on the first communication standard is added to user data, is received and the protocol data is removed from the received data packet to derive the user data;

second driver means for providing such a process that the data packet based on a first communication standard, which is generated by said first driver means, is received and in addition protocol data based on a second communication standard is added to the received data packet to generate a data packet based on the second communication standard, and a data packet based on the second communication standard, in which protocol data based on the second communication standard is added to a data packet based on the first communication standard in which data based on the first communication standard is added to user data, is received and the protocol data based on the second communication standard is removed from the received data packet to derive the data packet based on the first communication standard and then the derived data packet is transferred to said first driver means; and a communication unit for providing such a process that the data packet based on the second communication standard is received from said second driver means and the received data packet is transmitted to an exterior, and the data packet based on the second communication standard is received from the exterior and the received data packet is transmitted to said second driver means.

That is, the first communication system of the present invention is a combination of the protocol conversion apparatus of the present invention and the communication apparatus of the present invention. This feature makes it possible to perform a communication with the exterior in accordance with a communication format based on the first communication standard using a communication apparatus performing a communication based on the second communication standard through the protocol conversion apparatus.

In this case, the first communication system may accept the advantages of the protocol conversion apparatus of the present invention such that a small scale of circuit is used, and thus it is possible to contribute to a miniaturization of the apparatus and a cost-down.

It is noted that the protocol conversion apparatus and the communication apparatus, which constitute the first communication system of the present invention, includes all the ways associated with the various ways of the protocol conversion apparatus of the present invention and the various ways of the communication apparatus of the present invention.

Further, to achieve the above-mentioned objects, the present invention provides a second communication system comprising:

a protocol conversion apparatus comprising:

a first transmit-receive driver for transmitting and receiving a data packet based on a first communication standard, wherein protocol data based on the first communication standard is added to user data;

a second transmit-receive driver for transmitting and receiving a data packet based on a second communication standard, wherein protocol data based on the second communication standard is added to user data; and a protocol assembling and removing unit for providing such a process that the data packet based on the first communication standard, which is received by said first transmit-receive driver, is received and the protocol data based on the second communication standard is added to the received data packet to generate the data packet based on the second communication standard, and the generated data packet is transferred to said second transmit-receive driver for transmit-receive from said second transmit-receive driver, and further the data packet based on the second communication standard, which is received by said second transmit-receive driver, wherein the protocol data based on the first communication standard is added to the user data and in addition the protocol data based on the second communication standard is added, is received and the protocol data based on the second communication standard is removed from the received data packet to derive the data packet based on the first communication standard, wherein the protocol data based on the first communication standard is added to the user data, and the derived data packet is transferred to said first transmit-receive driver for transmit-receive from said first transmit-receive driver; and a communication program storage medium storing a communication program which causes a computer to operate as a communication apparatus for performing a communication with an exterior when the communication program is executed in the computer, wherein said communication program storage medium stores the communication program having:

first driver means for providing such a process that user data is received and protocol data based on a first communication standard is added to the received user data to generate a data packet based on the first communication standard, and a data packet, in which protocol data based on the first communication standard is added to user data, is received and the protocol data is removed from the received data packet to derive the user data; and second driver means for providing such a process that the data packet based on a first communication standard, which is generated by said first driver means, is received and in addition protocol data based on a second communication standard is added to the received data packet to generate a data packet based on the second communication standard, and a data packet based on the second communication standard, in which protocol data based on the second communication standard is added to a data packet based on the first communication standard in which data based on the first communication standard is added to user data, is received and the protocol data based on the second communication standard is removed from the received data packet to derive the data packet based on the first communication standard and then the derived data packet is transferred to said first driver means.

That is, the second communication system of the present invention is a combination of the protocol conversion apparatus of the present invention and the communication program storage medium of the present invention. Execution of the communication program stored in the communication program storage medium constituting the second communication system of the present invention in a computer having the function of performing a communication based on the second communication standard makes it possible that the computer serves as the communication apparatus of the present invention. The combination use of the computer serving as the communication apparatus and the protocol conversion apparatus makes it possible to implement the above-mentioned first communication system.

It is noted that the second communication system also includes all the ways associated with the various ways of the protocol conversion apparatus of the present invention and the various ways of the communication program stored in the communication program storage medium of the present invention.

It is acceptable that the above-mentioned protocol conversion apparatus and the above-mentioned communication apparatus are constituted in form of one apparatus. Here, such a one constituted in form of one apparatus is referred to as a communication apparatus.

As such a communication apparatus, there is provided a communication apparatus comprising:

a protocol conversion unit for providing such a process that data packet based on a first communication standard, in which protocol data based on the first communication standard is added to user data, is received and protocol data based on a second communication standard is added to the received data packet based on the first communication standard to generate the data packet based on the second communication standard, and the generated data packet is transmitted, and further data packet based on the second communication standard, wherein the protocol data based on the first communication standard is added to the user data and in addition the protocol data based on the second communication standard is added, is received and the protocol data based on the second communication standard is removed from the received data packet to derive the data packet based on the first communication standard, wherein the protocol data based on the first communication standard is added to the user data, and the derived data packet is transmitted;

a transmit-receive unit for providing such a process that the data packet based on the first communication standard is received from an exterior and transferred to said protocol conversion unit, and the data packet based on the first communication standard is received from said protocol conversion unit and transferred to the exterior; and a protocol processing unit for providing such a process that user data is received and protocol data based on the first communication standard is added to the received user data and in addition protocol data based on the second communication standard is added to generate a data packet based on the second communication standard, and the generated data packet is transferred to said protocol conversion unit, and further the data packet based on the second communication standard, in which protocol data based on the first communication standard is added to user data and in addition protocol data based on the second communication standard is added, is received from said protocol conversion unit and the protocol data based on the second communication standard is removed from the received data packet and further the protocol data based on the first communication standard is removed to derive the user data.

In the communication apparatus of the present invention as mentioned above, it is preferable that said transmit-receive unit for providing such a process that the data packet based on the first communication standard is received from an exterior on a radio basis and transferred to said protocol conversion unit, and the data packet based on the first communication standard is received from said protocol conversion unit and transferred to the exterior on a radio basis.

BRIEF DESCRIPTION OF THE DRAWINGS

FIG. 4 is an explanatory view useful for understanding an operation of a protocol conversion apparatus constituting the communication system according to the earlier development, including the internal structure of the protocol conversion apparatus.

FIG. 5 is a typical illustration showing a flow of protocols for a data packet which serves as input and output of the protocol conversion apparatus shown in FIG. 4.

Each of FIGS. 6(A) and 6(B) is an explanatory view useful for understanding a communication functional portion of a personal computer constituting the communication system according to the earlier development.

Figure 1:
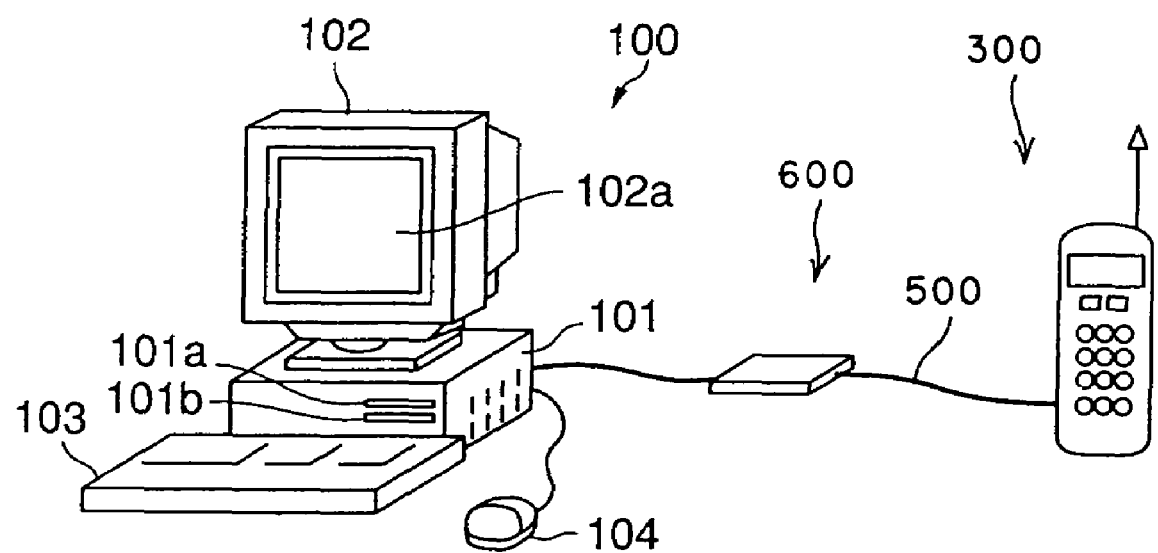
FIG. 1 is a perspective view of a communication system according to an embodiment of the present invention.

FIG. 7 is an explanatory view useful for understanding an operation of a protocol conversion apparatus constituting the communication system shown in FIG. 1 according to the embodiment of the present invention, including the internal structure of the protocol conversion apparatus.

Figure 8:
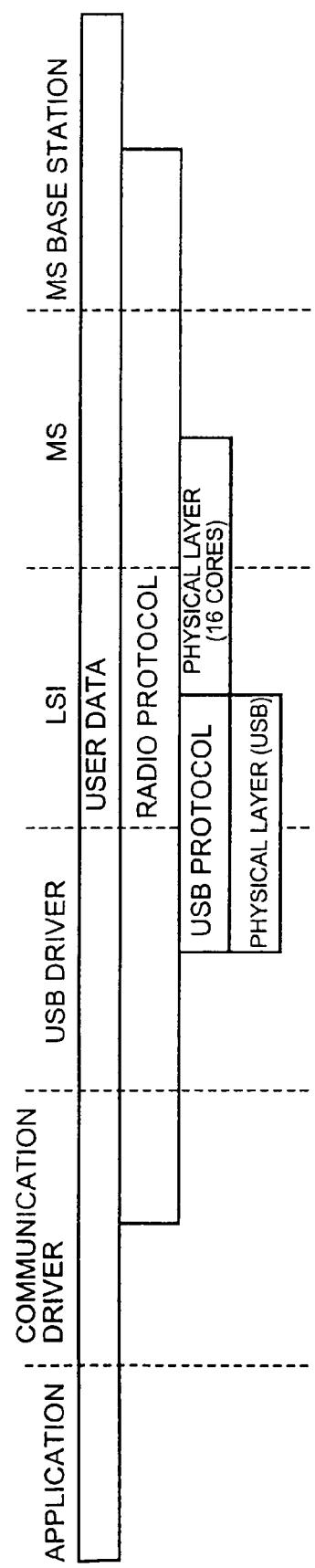

FIG. 8 is a typical illustration showing a flow of protocols for a data packet which serves as input and output of the protocol conversion apparatus shown in FIG. 7.

Each of FIGS. 9(A) and 9(B) is an explanatory view useful for understanding a communication functional portion of a personal computer (PC) constituting a first embodiment of a communication system according to the present invention.

Figure 10:
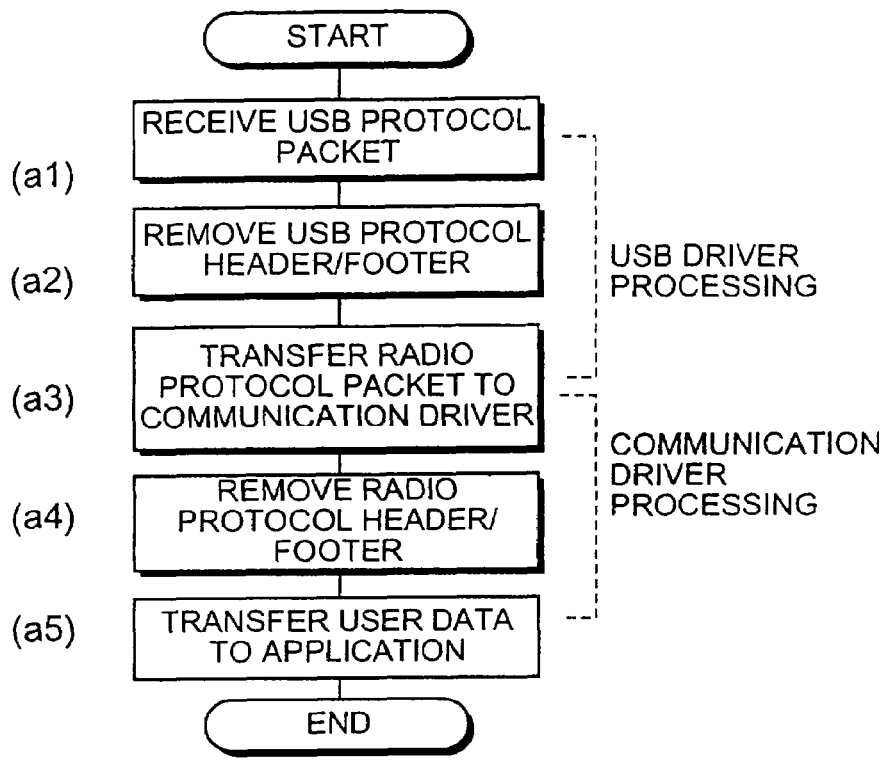

FIG. 10 is a flowchart as to reception of the data packet on the communication functional portion of the personal computer (PC).

Figure 11:
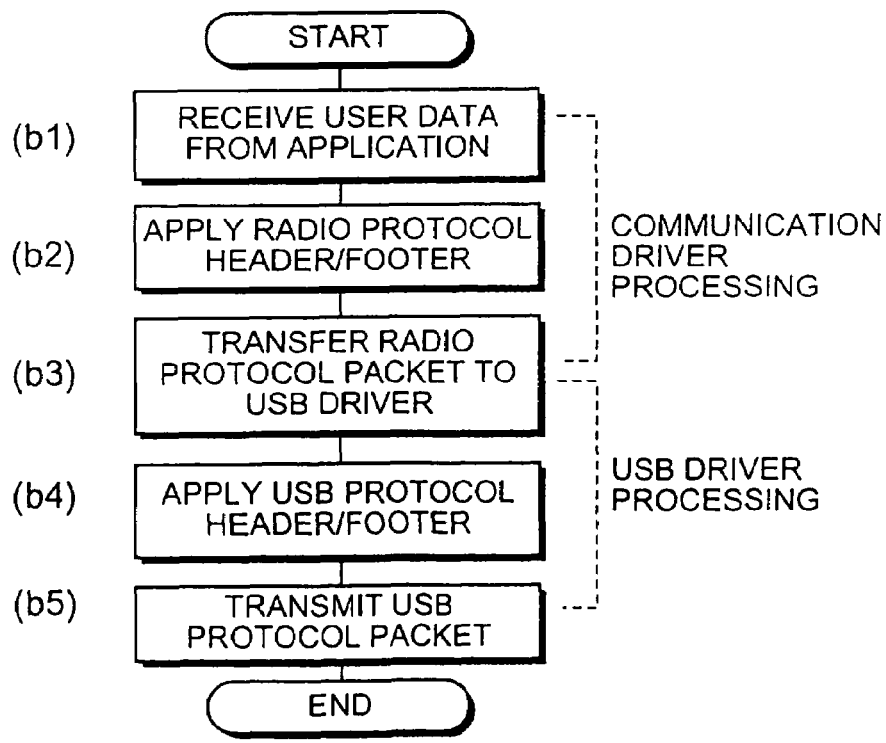

FIG. 11 is a flowchart as to transmission of the data packet on the communication functional portion of the personal computer (PC).

Figure 12:
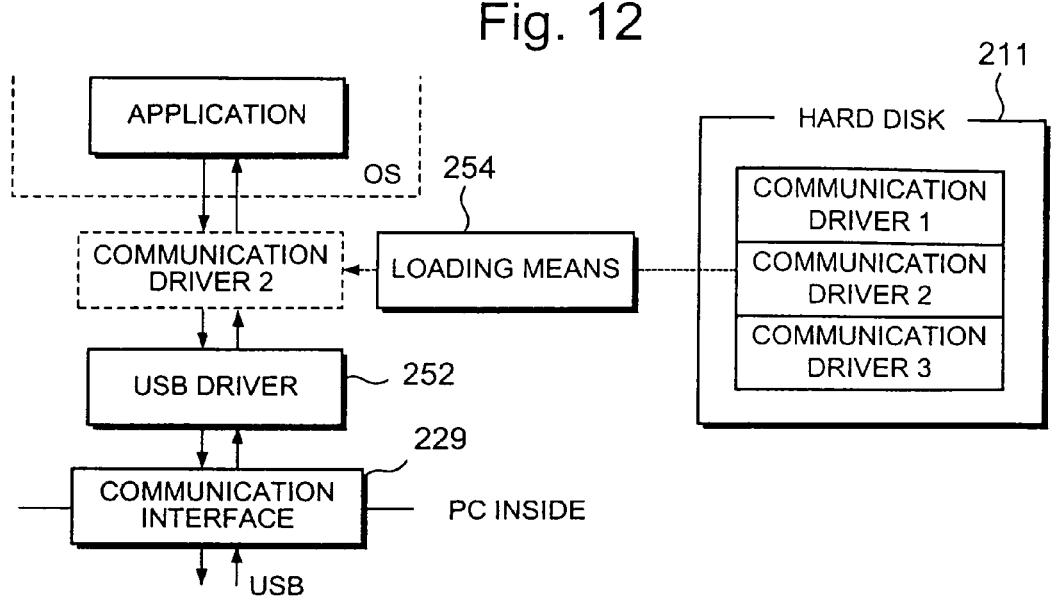

FIG. 12 is an explanatory view useful for understanding a communication functional portion of a personal computer (PC) constituting a second embodiment of a communication system according to the present invention.

Figure 13:
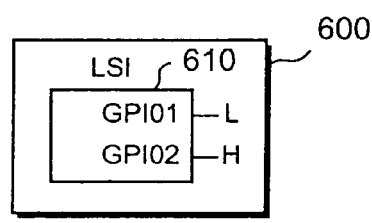

FIG. 13 is a typical illustration of the protocol conversion apparatus constituting a second embodiment of a communication system according to the present invention.

Figure 14:
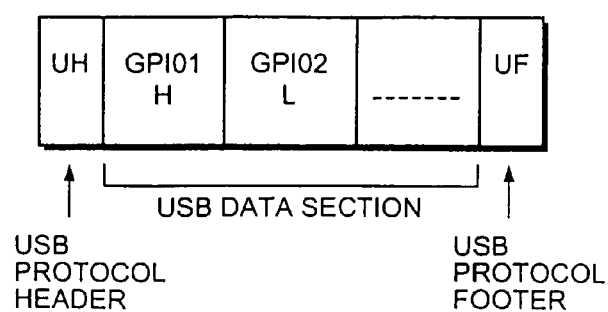

FIG. 14 is an illustration of a USB protocol packet for transmitting setting information for 'H' level and 'L' level of GPI01 and GPI02 to the PC.

Figure 15:
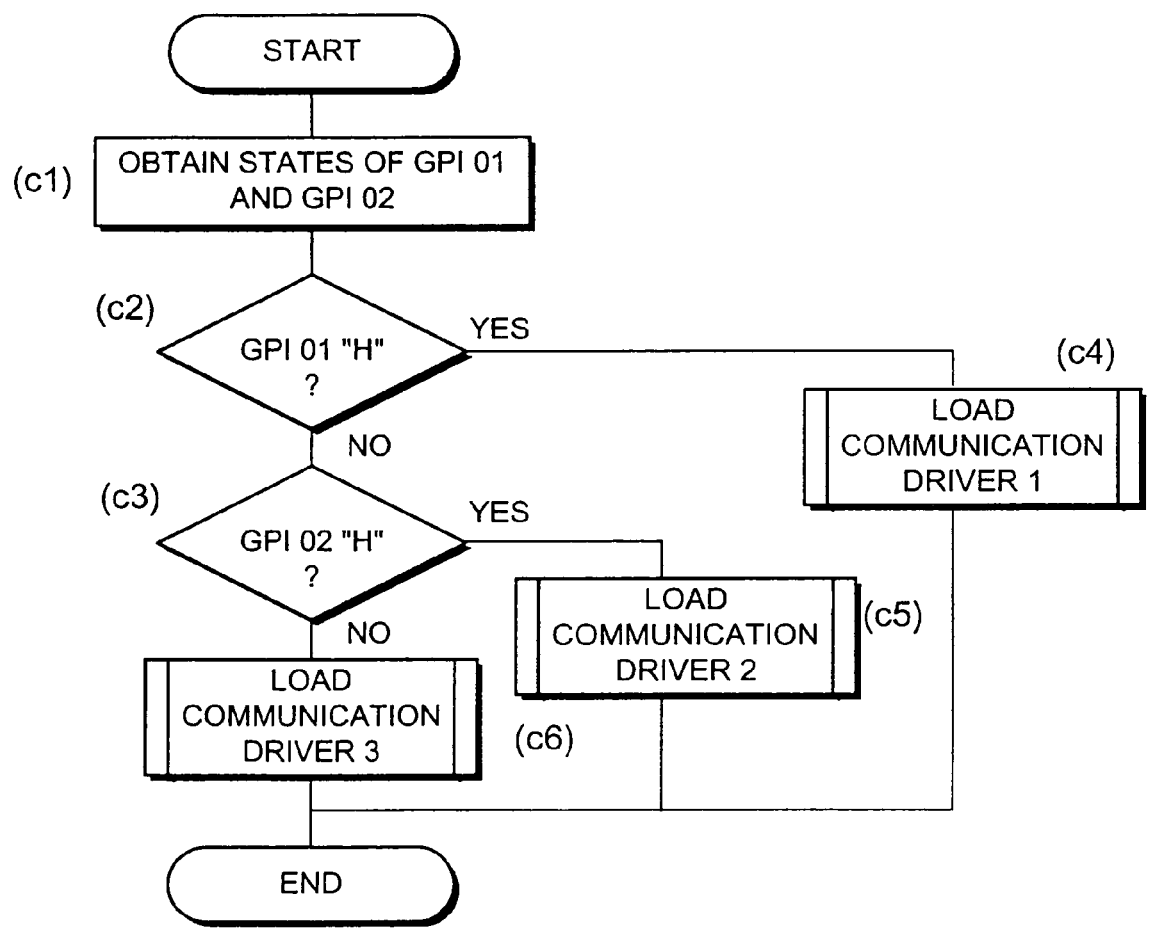

FIG. 15 is a flowchart useful for understanding a communication driver setting to be executed in the PC which receives the USB protocol packet as shown in FIG. 14.

Figure 16:
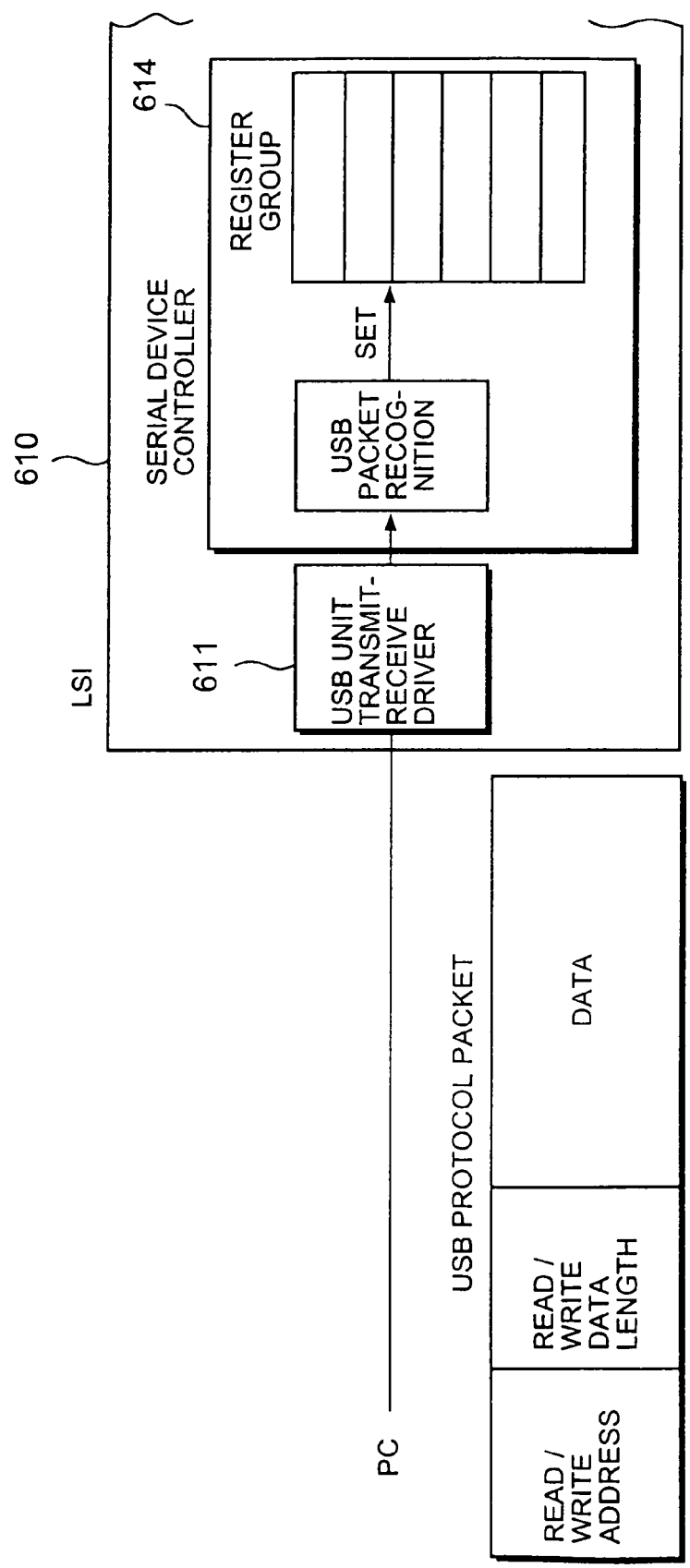

FIG. 16 is a view partially showing a structure of an LSI in a protocol conversion apparatus constituting a third embodiment of a communication system according to the present invention.

Figure 17:
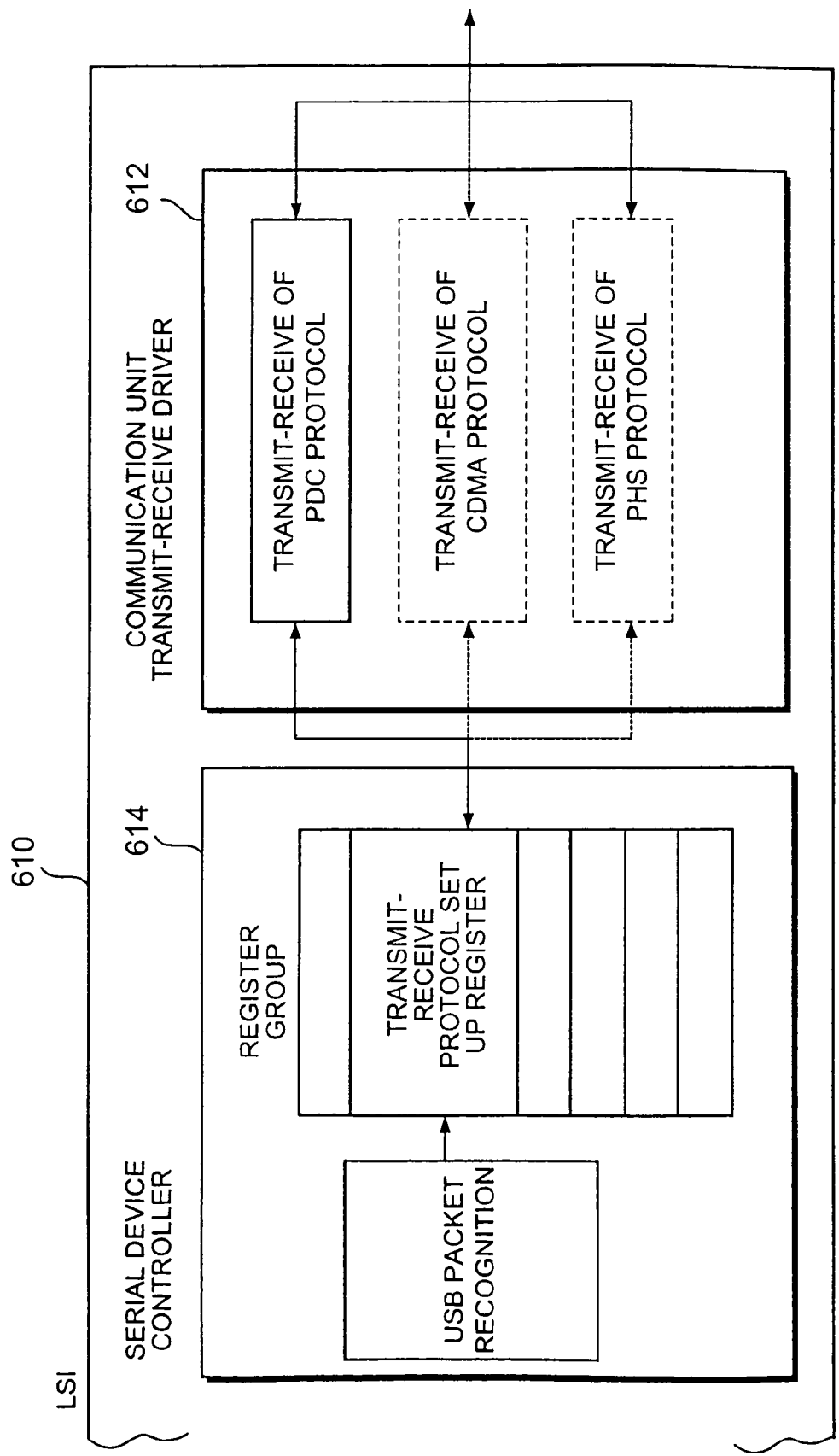

FIG. 17 is a view partially showing a structure of an LSI in a protocol conversion apparatus constituting a third embodiment of a communication system according to the present invention.

Figure 18:
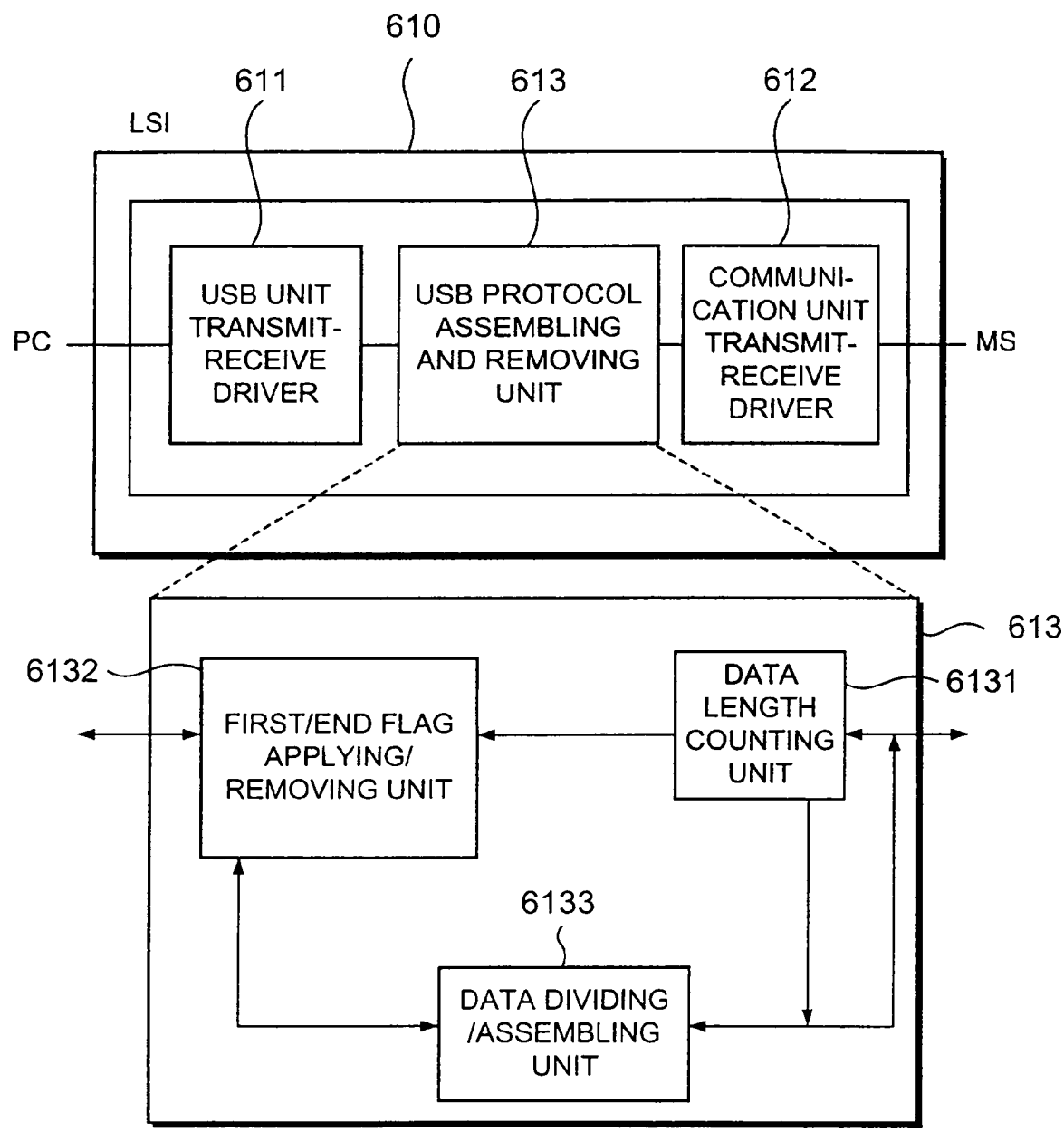

FIG. 18 is a view showing an internal structure of an LSI in a protocol conversion apparatus constituting a fourth embodiment of a communication system according to the present invention.

FIG. 19 is a view showing a data structure of data to be transferred through an LSI.

FIG. 20 is a schematic construction view of one embodiment of a communication apparatus having a function of a protocol conversion apparatus according to the present invention and a function of performing a radio communication with the exterior.

FIG. 21 is a view showing a modification of the communication apparatus shown in FIG. 20.

DETAILED DESCRIPTION OF PREFERRED EMBODIMENTS

Embodiments of the present invention will be described with reference to the accompanying drawings.

FIG. 1 is a perspective view of a communication system according to an embodiment of the present invention.

The communication system comprises a personal computer 100, a portable telephone 300, and a protocol conversion apparatus 600 connected between the personal computer 100 and the portable telephone 300 via a communication cable 500. As the protocol conversion apparatus 600, it is acceptable to use any type of ones such that it is shaped as a card to be inserted into the personal computer 100, or alternatively it is a circuit substrate to be loaded inside the personal computer 100, as well as a type, as shown in FIG. 1, in which it is disposed on the communication cable 500. In the present embodiment, it is assumed that as shown in FIG. 1, the protocol conversion apparatus 600 is connected between the personal computer 100 and the portable telephone 300 via the communication cable 500.

The personal computer 100 serves as a communication apparatus when the internal communication program is executed.

The personal computer 100 has a function of performing a communication in accordance with a communication scheme based on the USB standards (an example of a second communication standard referred to in the present invention). The portable telephone 300 has a function of performing a communication in accordance with a communication scheme based on PDC standards (an example of a first communication standard referred to in the present invention). The protocol conversion apparatus 600 has such a function that when a data packet based on the USB standards is transmitted from the personal computer 100, the data packet is converted into a data packet based on the PDC standards and then transmitted to the portable telephone 300, and when a data packet based on the PDC standards is transmitted from the portable telephone 300, the data packet is converted into a data packet based on the USB standards and then transmitted to the personal computer. Details of those will be described later.

The computer system 100 comprises a mainframe 101 into which a CPU, a RAM, a hard disk and etc. are incorporated, a CRT display 102 for performing a screen display on a display screen 102a in accordance with an instruction from the main frame 101, a keyboard 103 for entering a user's instruction and character information into the computer system, and a mouse 104 for entering an input according to an icon or the like displayed at a position on the display screen 102a through a designation of the icon or the like.

The main frame 101 is provided with a floppy disk loading slot 101a and a CDROM loading slot 101b which are adapted for detachably loading a floppy disk 212 and a CDROM 210 (cf. FIG. 2), respectively. The main frame 101 contains a floppy disk driver 224 and a CDROM driver 225 (cf. FIG. 2) for driving the floppy disk 212 and the CDROM 210, respectively.

Here, the CDROM 210 stores an example of a communication program referred to in the present invention. The CDROM 210 is loaded through the CDROM loading slot 101b into the main frame 101 so that the CDROM driver 225 installs the communication program stored in the CDROM 210 onto the hard disk of the computer system 100.

Figure 2:
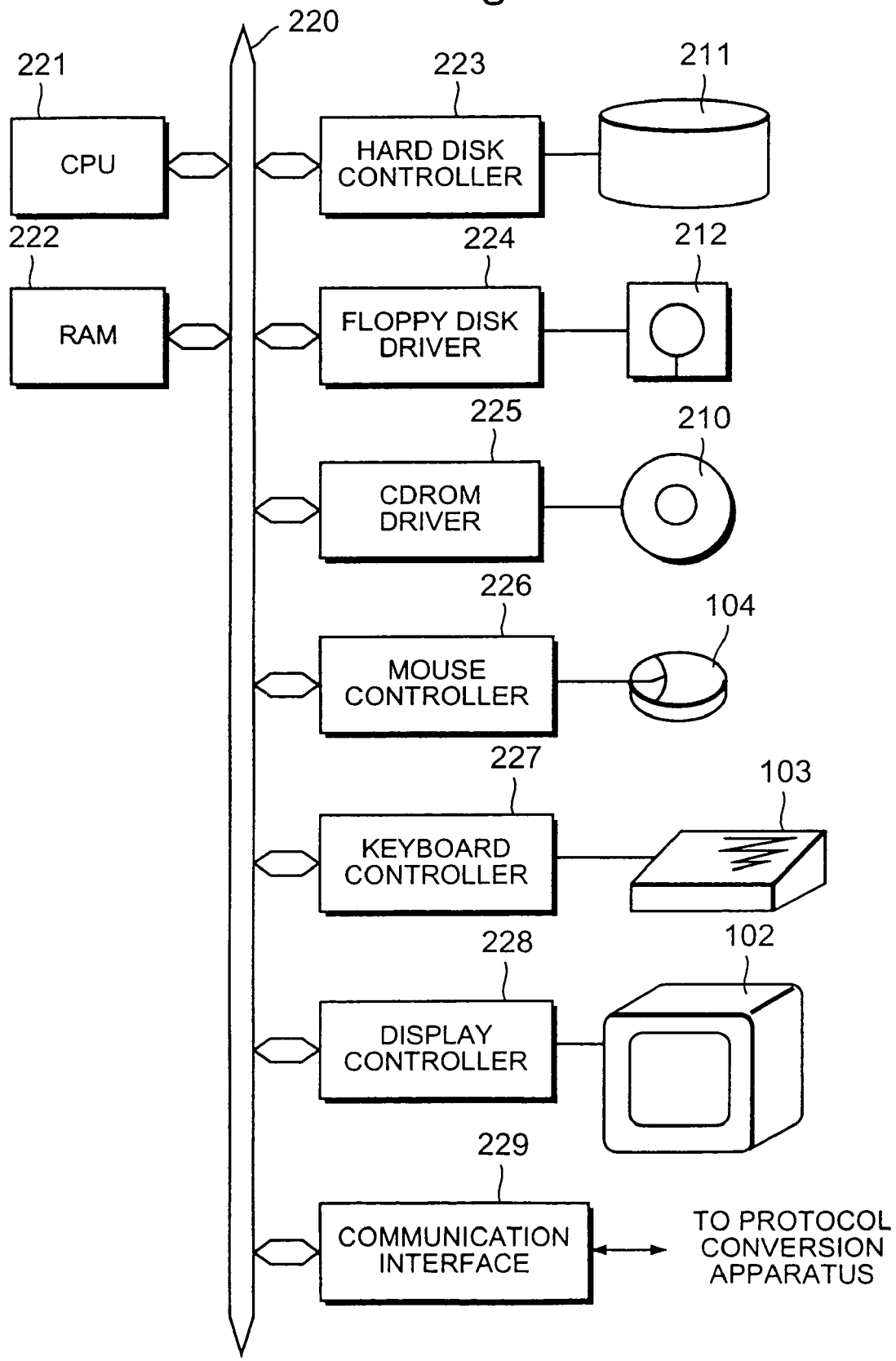
FIG. 2 is a schematic diagram showing a structure of a computer system shown in FIG. 1.

FIG. 2 is a schematic diagram showing a hardware construction of the computer system shown in FIG. 1.

The computer system comprises a central processing unit (CPU) 221, a RAM 222, a hard disk controller 223, the floppy disk driver 224, the CDROM driver 225, a mouse controller 226, a keyboard controller 227, a display controller 228, and a communication interface 229. Those elements are mutually connected via a communication bus 220.

The floppy disk driver 224 and the CDROM driver 225 access the floppy disk 212 and the CDROM 210, respectively, as explained referring to FIG. 1, when they are loaded.

The computer system shown in FIG. 2 further comprises a hard disk 211 to be accessed by the hard disk controller 223, a mouse 104 to be controlled by the mouse controller 226, a keyboard 103 to be controlled by the keyboard controller 227, and a CRT display 102 to be controlled by the display controller 228.

The communication interface 229 is a hardware having a function of performing a communication based on the USB standard between the personal computer 100 and the external apparatus (in this case, the protocol conversion apparatus 600).

As mentioned above, the CDROM 210 stores a communication program referred to in the present invention. The CDROM driver 225 reads the communication program from the CDROM 210, and the hard disk controller 223 stores the communication program thus read into the hard disk 211 via the bus 220. In the actual execution, the communication program in the hard disk 211 is loaded onto the RAM 222 and is executed by the CPU 221.

Figure 3:
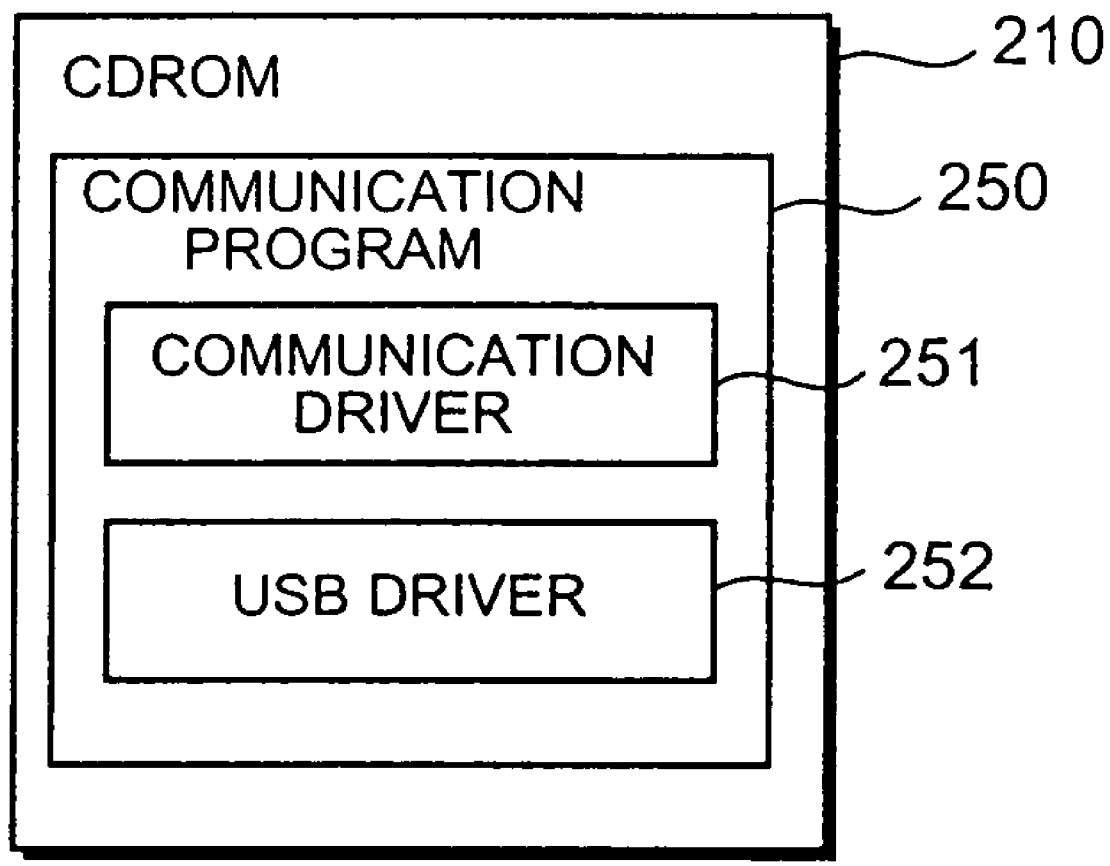
FIG. 3 is a typical illustration of a communication program stored in a CDROM.

FIG. 3 is a typical illustration of a communication program stored in a CDROM.

A CDROM 210 stores a communication program 250 comprising a communication driver 251 and an USB driver 252. The communication driver 251 and the USB driver 252 constitute a communication program referred to in the present invention, and correspond to examples of a first transmit-receive driver and a second transmit-receive driver, respectively. The details of operations will be described later.

Here, there will be explained a communication system to be compared with the present invention.

FIG. 4 is an explanatory view useful for understanding an operation of a protocol conversion apparatus constituting the communication system according to the earlier development, including the internal structure of the protocol conversion apparatus. FIG. 5 is a typical illustration showing a flow of protocols for a data packet which serves as input and output of the protocol conversion apparatus shown in FIG. 4. Each of FIGS. 6(A) and 6(B) is an explanatory view useful for understanding a communication functional portion of a personal computer constituting the communication system according to the earlier development.

A protocol conversion apparatus 700 shown in FIG. 4 is provided with an LSI 710, a CPU 720 and a ROM 730. The LSI 710 is loaded with a USB unit transmit-receive driver 711 which is a hardware serving to perform transmit-receive operations for a data packet (here it is referred to as a USB protocol packet) based on the USB standard, and a communication unit transmit-receive driver 712 which is a hardware serving to perform transmit-receive operations for a data packet (here it is referred to as a radio protocol packet) based on radio communication standards (PDC standards).

The CPU 720 executes a program stored in the ROM 730 to perform a conversion between the radio protocol packet and the USB protocol packet. More in detail, when a radio protocol packet is transmitted from a portable telephone (hereinafter, it happens that the portable telephone is referred to as "MS" simply) via a 16 cores-cable 500a, the radio protocol packet is received by the communication unit transmit-receive driver 712 and then transferred to the CPU 720. The CPU 720 performs a conversion from the radio protocol packet to the USB protocol packet through execution of the program stored in the ROM 730 and transfers the converted USB protocol packet to the USB unit transmit-receive driver 711. The USB unit transmit-receive driver 711 transmits the received USB protocol packet via a USB cable 500b to a personal computer (hereinafter, it happens that the personal computer is referred to as "PC" simply).

On the other hand, when a USB protocol packet is transmitted from a PC via the USB cable 500b, the USB protocol packet is received by the USB unit transmit-receive driver 711 and then transferred to the CPU 720. The CPU 720 converts the received USB protocol packet to the radio protocol packet through execution of the program stored in the ROM 730 and transfers the converted radio protocol packet to the communication unit transmit-receive driver 712. The communication unit transmit-receive driver 712 transmits the received radio protocol packet via the 16 cores-cable 500a to a MS.

The USB protocol packet, which is communicated between the PC and the USB unit transmit-receive driver 711, is a data packet wherein a USB protocol header UH and a USB protocol footer UF, which are the protocol data based on the USB standards, are added to the user data to be transmitted. The radio protocol packet, which is communicated between the MS and the communication unit transmit-receive driver 712, is a data packet wherein a radio protocol header H and a radio protocol footer F, which are the protocol data based on the radio communication standards (here PDC standards), are added to the user data to be transmitted. Upon receipt of the USB protocol packet from the USB unit transmit-receive driver 711, the CPU 720 removes the USB protocol header UH and a USB protocol footer UF from the USB protocol packet to derive the user data and adds the radio protocol header H and the radio protocol footer F to the user data thus derived so as to generate the radio protocol packet, and transfers the generated radio protocol packet to the communication unit transmit-receive driver 712. On the other hand, upon receipt of the radio protocol packet from the communication unit transmit-receive driver 712, the CPU 720 removes the radio protocol header H and the radio protocol footer F from the radio protocol packet to derive the user data and adds the USB protocol header UH and the USB protocol footer UF to the user data thus derived so as to generate the USB protocol packet, and transfers the generated USB protocol packet to the USB unit transmit-receive driver 711. This processing is very complicated. According to the system of the earlier development, as shown in FIG. 4, the protocol conversion apparatus is loaded with the CPU 720 and the ROM 730 storing a program to be executed by the CPU 720. This causes the protocol conversion apparatus to be enlarged in size and increased in cost.

Here, there will be explained a flow of a protocol of data passing through the protocol conversion apparatus 700 as shown in FIG. 4. As shown in FIG. 5, between an MS base station and an MS, a radio protocol packet wherein a radio protocol data (a radio protocol header and a radio protocol footer) is added to the user data is communicated on a radio basis. On the other hand, between the MS and the CPU in the protocol conversion apparatus 700, the radio protocol packet is communicated through the 16 cores-cable in form of a physical layer. The CPU performs the conversion between the radio protocol packet wherein the radio protocol data is added to the user data and the USB protocol packet wherein the USB protocol data (the USB protocol header and the USB protocol footer) is added to the user data. Between the CPU and a USB driver of the PC, which will be described hereinafter, the USB protocol packet is transmitted through a USB cable in form of a physical layer.

The PC (personal computer) receives by a communication interface 229 as a hardware, as shown in FIG. 6(A), the USB protocol packet from the protocol conversion apparatus 700 (cf. FIG. 4), and transfers the same to the USB driver 252 (cf. FIG. 3 also). The USB driver 252 is a communication program to be executed in the CPU 221 (cf. FIG. 3) of the PC. The USB driver 252 removes, as shown in FIG. 6 (B), the USB protocol data (the USB protocol header UH and the USB protocol footer UF) from the USB protocol packet to derive the user data, and transfers the user data thus derived to an application program which operates on an OS.

On the other hand, in the event that data is transmitted from the PC to the exterior, the USB driver 252 receives the user data from the application program side, and adds the USB protocol data (the USB protocol header UH and the USB protocol footer UF) to the received user data to generate the USB protocol packet. The USB protocol packet thus generated is transferred to the communication interface 229 in form of a hardware so that the communication interface 229 transmits the USB protocol packet via the USB cable to the protocol conversion apparatus.

The communication system according to the earlier development is constituted as mentioned above referring to FIGS. 4 to 6. As seen from the above-mentioned explanation, the communication system according to the earlier development needs the CPU and the ROM for processing of a conversion between the USB protocol packet and the radio protocol packet in the protocol conversion apparatus 700. This causes the protocol conversion apparatus to be complicated, and also the apparatus to be large-sized and to be expensive. This problem has been solved in accordance with the embodiments of the present invention explained referring to FIGS. 1 to 3 and further will be explained hereinafter.

FIG. 7 is an explanatory view useful for understanding an operation of a protocol conversion apparatus constituting the communication system shown in FIG. 1 according to the embodiment of the present invention, including the internal structure of the protocol conversion apparatus. The embodiment shown in FIG. 7 corresponds to the comparative example shown in FIG. 4.

A protocol conversion apparatus 600 shown in FIG. 7 comprises, in the same way as the protocol conversion apparatus 700 shown in FIG. 4, an LSI 610. The LSI 610 is loaded with a USB unit transmit-receive driver 611 which serves to perform transmit-receive operations for a USB protocol packet, and a communication unit transmit-receive driver 612 which serves to perform transmit-receive operations for a radio protocol packet. However, the protocol conversion apparatus 600 has no elements corresponding to the CPU 720 and the ROM 730 which are included in the protocol conversion apparatus 700 shown in FIG. 4. Instead of this, the LSI 610 is loaded with a USB protocol assembling and removing unit 613. According to the present embodiment, as shown in FIG. 7, the USB protocol assembling and removing unit 613 is loaded into the LSI 610 together with the USB unit transmit-receive driver 611 and the communication unit transmit-receive driver 612.

When the communication unit transmit-receive driver 612 receives the radio protocol packet transmitted from the MS, the USB protocol assembling and removing unit 613 receives the radio protocol packet, and regards the user data and the radio protocol data (the radio protocol header H and a radio protocol footer F), which constitute the radio protocol packet, as a united body of data without a distinction therebetween and adds the USB protocol data (the USB protocol header UH and the USB protocol footer UF) to the united body of data so as to produce a USB protocol packet. The USB protocol packet thus produced is transferred to the USB unit transmit-receive driver 611. The USB unit transmit-receive driver 611 transmits the received USB protocol packet.

On the other hand, the PC transmits a USB protocol packet, as shown in FIG. 7, in which the radio protocol data (the radio protocol header H and a radio protocol footer F) is added to the user data and further the USB protocol data (the USB protocol header UH and the USB protocol footer UF) is added. The USB protocol packet is received by the USB unit transmit-receive driver 611 of the protocol conversion apparatus 600. Then, the USB protocol assembling and removing unit 613 receives the USB protocol packet and removes the USB protocol data (the USB protocol header UH and the USB protocol footer UF) from the USB protocol packet so as to derive the radio protocol packet. The radio protocol packet thus derived is transferred to the communication unit transmit-receive driver 612. The communication unit transmit-receive driver 612 transmits the received radio protocol packet to the MS.

In this manner, the USB protocol assembling and removing unit 613 performs applying of the USB protocol header UH and the USB protocol footer UF to the radio protocol packet and removing of the USB protocol header UH and the USB protocol footer UF from the USB protocol packet. This processing is simple processing and can be dealt with a small scale of circuit. Therefore, such a circuit can be incorporated into the LSI 610. Thus, it is possible to implement cost-down and miniaturization of the apparatus.

FIG. 8 is a typical illustration showing a flow of protocols for a data packet which serves as input and output of the protocol conversion apparatus shown in FIG. 7.

Between the MS base station and the MS, a radio protocol packet wherein radio protocol data (a radio protocol header H and a radio protocol footer F) is added to the user data is communicated on a radio basis. On the other hand, between the MS and the LSI 610 of the protocol conversion apparatus 600 shown in FIG. 7, the radio protocol packet is communicated through the 16 cores-cable in form of a physical layer. Inside the LSI 610, in accordance with the manner as mentioned above, there is performed applying of the USB protocol packet data (the USB protocol header UH and the USB protocol footer UF) to the radio protocol packet and removing of the USB protocol packet data (the USB protocol header UH and the USB protocol footer UF) from the USB protocol packet. Between the LSI 610 and a USB driver of the PC, which will be described hereinafter, a USB protocol packet wherein a radio protocol packet is covered with USB protocol data is transmitted through a USB cable in form of a physical layer.

With respect to a flow of the data packet in the PC, it will be explained referring to FIGS. 9(A)-9(B) to FIG. 11 together with FIG. 8.

Each of FIGS. 9(A) and 9(B) is an explanatory view useful for understanding a communication functional portion of a personal computer (PC) constituting a first embodiment of a communication system according to the present invention. FIG. 10 is a flowchart as to reception of the data packet on the communication functional portion of the personal computer (PC). FIG. 11 is a flowchart as to transmission of the data packet on the communication functional portion of the personal computer (PC).

When the USB protocol packet wherein a radio protocol packet is covered with the USB protocol header UH and the USB protocol footer UF is transmitted from the protocol conversion apparatus (LSI) through a USB cable 500b in accordance with the manner as mentioned above, the transmitted USB protocol packet is received by the communication interface 229 in form of a hardware shown in FIG. 9 (A) and then transferred to the USB driver 252 as a part of the communication program (step a1 of FIG. 10).

In the USB driver 252, the USB protocol header UH and the USB protocol footer UF are removed from the USB protocol packet wherein the radio protocol header H and the radio protocol footer F are added to user data and further the USB protocol header UH and the USB protocol footer UF are added, so that the radio protocol packet wherein the radio protocol header H and the radio protocol footer F are added to the user data is derived (step a2 of FIG. 10). This radio protocol packet is transferred to the communication driver 251 (step a3 of FIG. 10). The communication driver 251 is also a part of the communication program.

The communication driver 251 removes the radio protocol header H and the radio protocol footer F from the received radio protocol packet to derive the user data (step a4 of FIG. 10), and transmits the derived user data to the application program.

On the other hand, when data is transmitted from the PC to the exterior, the communication driver 251 receives the user data from the application program (step b1 of FIG. 11) and applies the radio protocol header H and the radio protocol footer F to the user data to generate a radio protocol packet (step b2 of FIG. 11), and transmits the radio protocol packet thus generated to the USB driver 252 (step b3 of FIG. 11). Upon receipt of the radio protocol packet, the USB driver 252 applies the USB protocol header UH and the USB protocol footer UF to the received radio protocol packet to generate a USB protocol packet (step b4 of FIG. 11), and transfers the generated USB protocol packet to the communication interface 229 (step b5 of FIG. 11). The communication interface 229 transmits the received USB protocol packet to the protocol conversion apparatus 600 (cf. FIG. 7).

According to the communication system of the present embodiment, as mentioned above, there is no need that the protocol conversion apparatus is provided with CPU and ROM. This feature makes it possible to implement miniaturization and cost-down of the apparatus. Incidentally, according to the communication system of the present embodiment, as compared with the comparative example explained referring to FIGS. 4 to 7, the communication driver 251, which is a part of the communication program to be executed in the PC, is added. It is noted, however, that an additional provision of the communication driver 251 means an increment of the program, but involves no additional part on a hardware basis. Further, it is noted that a process by the communication driver 251 is simple and an increment of an amount of program is not so great.

Next, in addition to the first embodiment of the present invention as mentioned above, there will be described a second embodiment of the present invention in which a communication system between the MS and the communication unit transmit-receive driver 612 of the protocol conversion apparatus 600 shown in FIG. 7 is selectable among from a plurality of communication systems based on a plurality of communication standards.

FIG. 12 is an explanatory view useful for understanding a communication functional portion of a personal computer (PC) constituting a second embodiment of a communication system according to the present invention.

The hard disk 211 (cf. FIG. 2) of the PC stores therein a plurality of types of communication drivers, such as a communication driver for performing applying and removing of the radio protocol header/footer based on PDC standards, a communication driver for performing applying and removing of the radio protocol header/footer based on a PHS scheme of standard, and a communication driver for performing applying and removing of the radio protocol header/footer based on a CDMA scheme of standard.

According to the second embodiment, upon receipt of information of designating a communication driver to be actually executed, of the plurality of types of communication drivers stored in the hard disk 211, from the protocol conversion apparatus side, loading means 254 reads out the designated communication driver from the hard disk 211 to RAM 222 (cf. FIG. 2). The loading means 254 corresponds to an example of "standard setting means for activating a first driver means" of the communication apparatus according to the present invention.

FIG. 13 is a typical illustration of the protocol conversion apparatus constituting a second embodiment of a communication system according to the present invention.

The LSI 610, which is loaded on the protocol conversion apparatus 600, has two signal input terminals GPI01 and GPI02 which receive input signals fixed to 'H' level and 'L' level, respectively. The LSI 610 determines a communication system between the communication unit transmit-receive driver 612 shown in FIG. 7 and the MS in accordance with the combination of the 'H' level and the 'L' level of the signals entered through the signal input terminals GPI01 and GPI02. That is, the communication unit transmit-receive driver 612 shown in FIG. 7 is capable of performing selectively a communication with the MS in any scheme of the PDC scheme, the PHS scheme and the CDMA scheme.

FIG. 14 is an illustration of a USB protocol packet for transmitting setting information for 'H' level and 'L' level of GPI01 and GPI02 to the PC.

When the PC is connected to the protocol conversion apparatus via a cable, the USB unit transmit-receive driver 611 of the protocol conversion apparatus 600 generates and transmits to the PC a USB protocol packet, as shown in FIG. 14, in which the USB protocol header UH and the USB protocol footer UF are applied to the USB data section including information indicative of the state of 'H' level and 'L' level of GPI01 and GPI02.

FIG. 15 is a flowchart useful for understanding a communication driver setting to be executed in the PC which receives the USB protocol packet as shown in FIG. 14.

When the USB protocol packet shown in FIG. 14 is received by the communication interface 229 shown in FIG. 12 and is transferred to the USB driver 252, the USB driver 252 derives the USB data section shown in FIG. 14 and transmits the same to the loading means 254.

The loading means 254 derives information indicative of two states of 'H' level and 'L' level of GPI01 and GPI02 of the USB data section (step c1 of FIG. 15), and determines whether the GPI01 offers 'H' level (step c2 of FIG. 15) and whether the GPI02 offers 'H' level (step c3 of FIG. 15) when the GPI01 offers 'L' level, and loads the associated communication driver in accordance with the determination result (steps c4, c5 and c6 of FIG. 15). The loaded communication driver is actually executed.

According to the second embodiment as mentioned above referring to FIGS. 12 to 15, it is possible to deal with a various types of communication systems by simply setting 'H' level and 'L' level of GPI01 and GPI02, without necessity of preparing a plurality of various types of LSI which are mutually different in the internal structure.

FIGS. 16 and 17 are views each partially showing a structure of an LSI in a protocol conversion apparatus constituting a third embodiment of a communication system according to the present invention.

A structure of the communication part of the PC in the third embodiment is the same as that of the second embodiment as shown FIG. 12, but a point that a communication standard between the protocol conversion apparatus (the LSI 610 shown in FIGS. 16 and 17) and the MS is set up at the PC side but not the protocol conversion apparatus side.

In the PC side, when a communication standard for an MS (a portable telephone) to be connected is set up, for instance, in accordance with an instruction of the user, the loading means 254 shown in FIG. 2 loads a communication driver according to the communication standard thus set up.

The USB driver 252 generates a USB protocol packet in which information for designating a communication standard and for setting up a desired operation of a protocol conversion apparatus for a PC or a user of the PC is described, and transmits the USB protocol packet thus generated via the communication interface 229 to the protocol conversion apparatus.

FIG. 16 shows a data section of the USB protocol packet to be transmitted from the PC to the protocol conversion apparatus (the USB protocol header/footer is omitted).

The LSI 610 of the protocol conversion apparatus 600 is provided with a serial device controller 614 having a register group comprising a plurality of registers for storing the content of the USB protocol packet transmitted.

The USB protocol packet shown in FIG. 16 has a read/write address which is an address of any one of the registers of the register group, a read/write data length indicative of how many registers after the indicated address data is set up in, and data to be set up in those registers.

Such a format of USB protocol packet is transmitted from the PC via the USB unit transmit-receive driver 611 of the LSI 610 to the serial device controller 614. The serial device controller 614 recognizes the content of the USB protocol packet and writes the designated data into a data length of registers after the register of the indicated address. On the other hand, in the PC side, it is also possible to read the data written into the register group. At that time, the USB unit transmit-receive driver 611 generates the USB protocol packet of the format shown in FIG. 16 and transmits the same to the PC.

This arrangement makes it possible to perform setting up and alteration of the function of the LSI 610 by access from the PC side. Further, an adoption of the USB protocol packet of the format shown in FIG. 16 makes it possible to access a plurality of registers on a batch basis, and thereby implementing a higher speed of access for registers.

As shown in FIG. 17, a transmit-receive protocol set up register exists in the register group of the serial device controller 614. On the other hand, the communication unit transmit-receive driver 612 (cf. FIG. 7 together with FIG. 17) of the LSI 610 is operative in any communication system of the PDC scheme, the CDMA scheme and the PHS scheme, and is constructed in such a manner that a transmit-receive is performed with a protocol according to the communication system based on setting up of the transmit-receive protocol set up register.

In this manner it is acceptable that a communication system is set up at the PC end.

FIG. 18 is a view showing an internal structure of an LSI in a protocol conversion apparatus constituting a fourth embodiment of a communication system according to the present invention. FIG. 19 is a view showing a data structure of data to be transferred through the LSI.

A USB protocol assembling and removing unit 613 of a LSI 610 in the fourth embodiment of a communication system has a function shown in FIG. 18 as well as the above-mentioned function of assembling and removing of the USB protocol data (the USB protocol header and the USB protocol footer). That is, the USB protocol assembling and removing unit 613 comprises a data length counting unit 6131, a first/end flag applying/removing unit 6132 and a data dividing/assembling unit 6133.

It is assumed that the MS transmits to a communication unit transmit-receive driver 612 of the LSI 610 a radio protocol packet having a data length of 300 bytes far exceeding a data length which can be dealt with as the USB protocol packet. At that time, the data length counting unit 6131, which constitutes the USB protocol assembling and removing unit 613, counts a data length of the radio protocol packet transmitted on a serial basis, and informs the data dividing/assembling unit 6133 of it whenever the counted value reaches a data length (here, 62 bytes) capable of being dealt with in form of the USB protocol packet. Further, the data length counting unit 6131 informs the first/end flag applying/removing unit 6132 of the fact that in start of the reception of the radio protocol packet, the reception of the radio protocol packet is started, and in termination of the reception of the radio protocol packet, the reception of the radio protocol packet is terminated.

The data dividing/assembling unit 6133 transfers the radio protocol packet to the first/end flag applying/removing unit 6132 with partitions every 62 bytes in accordance with information from the data length counting unit 6131. The first/end flag applying/removing unit 6132 provides such a process that when the received 62 bytes of data is a first 62 bytes of data of the radio protocol packet, as shown in part (A) of FIG. 19, flags denoted by the first flag '1' and the end flag '0' are applied to the 62 bytes of data and in addition data indicative of data length (here 64 bytes) is applied to the 62 bytes of data, and for the middle group of 64 bytes of data which are involved in first and end of 64 bytes of data, as shown in parts (B)-(D) of FIG. 19, flags denoted by the first flag '0' and the end flag '0' are applied to the 62 bytes of data and in addition data indicative of data length is applied to the 62 bytes of data, and for the final portion of data of the radio protocol packet, as shown in part (E) of FIG. 19, flags denoted by the first flag '0' and the end flag '1' are applied and in addition data indicative of data length is applied.

In the event that the final portion of data of the radio protocol packet is short in data length (here, a determined data length: 64 bytes), as shown in part (E) of FIG. 19, the data dividing/assembling unit 6133 has such a function that a padding of adding meaningless data after the final portion of data is performed to unify the data length to the determined data length. Thus, the first/end flag applying/removing unit 6132 applies information indicative of an effective data length (here, 50 bytes) as information indicative of data length of the final portion.

In this manner, unifying the data length makes it possible to deal with only a constant data length of data, thereby implementing a simple deal of data.

The radio protocol packet, which is divided into a plurality of portions as shown in parts (A) to (E) of FIG. 19, is subjected to such a process that USB protocol header/footer is applied to each divided portion to generate a USB protocol packet. The plurality of USB protocol packets thus generated are transmitted to the PC from the top in turn.

The construction of the communication portion of the PC is shown in FIG. 9 (A). The USB driver 252 removes the USB protocol header/footer from the plurality of USB protocol packets transmitted in turn and couples their data together so that the original radio protocol packet is reproduced. The radio protocol packet thus reproduced is transmitted to the communication driver 251.

In the event that a user data having a data length exceeding a data length capable of being dealt with as the USB protocol packet is transmitted from the PC side to the exterior, the communication driver 251 generates the radio protocol packet which is long in data length and transfers the same to the USB driver 252. The USB driver 252 performs the same processing as the USB protocol assembling and removing unit 613, as explained referring to FIG. 18, so that the radio protocol packet is divided into a plurality of portions as shown in parts (A) to (E) of FIG. 19 and a necessary information is added, and further a USB protocol header/footer is applied to each divided portion to generate a plurality of USB protocol packets. The plurality of USB protocol packets thus generated are sequentially transmitted via the communication interface 229 to the protocol conversion apparatus 600 (LSI 610).

In the LSI 610, while the plurality of USB protocol packets are sequentially received, the first/end flag applying/removing unit 6132, which constitutes the USB protocol assembling and removing unit 613, removes the first flag, the end flag and data as to the data length, and transmits the associated data to the data dividing/assembling unit 6133. The data dividing/assembling unit 6133 assembles the transmitted data to reproduce the original radio protocol packet and transmits the reproduced radio protocol packet to the communication unit transmit-receive driver 612. The communication unit transmit-receive driver 612 transmits the radio protocol packet which is long in data length to the MS.

An adoption of the above-mentioned constitution makes it possible to deal with data having a data length exceeding the maximum length of a USB protocol packet without deforming the radio protocol packet.

According to the various embodiments of the present invention as mentioned above, it is a premise that a protocol conversion apparatus is disposed between a PC and an MS. Thus, as a communication system adopted for a communication between the protocol conversion apparatus and the MS, there is raised the PDC scheme, the PHS scheme and the CDMA scheme. However, for the present invention, there is no need that a communication apparatus, which is to be connected to the protocol conversion apparatus, is an MS (a portable telephone terminal). It is acceptable that as the communication unit transmit-receive driver 612 shown in FIG. 7, a driver for performing a communication based on standards for an optical communication is used, or alternatively a driver for performing a communication based on standards for an RS232C is used. Further, it is acceptable that as shown in the second embodiment explained referring to FIGS. 12 to 14 and the third embodiment explained referring to FIGS. 16 and 17, a communication system is optionally selected among a plurality of communication systems and the optical communication scheme or the RS232C scheme is added as one of the selectable communication systems.

Furthermore, as a communication system of the PC side, the USB scheme is raised. However, the communication system of the PC side should not be restricted to the USB scheme. It is acceptable that for example, the RS232C scheme is adopted.

FIG. 20 is a schematic construction view of one embodiment of a communication apparatus having a function of a protocol conversion apparatus according to the present invention and a function of performing a radio communication with the exterior.

A communication apparatus 800 comprises a radio communication unit 810 having an antenna 811, a protocol conversion unit 820, a protocol processing unit 830 and an application execution unit 840.

The radio communication unit 810 corresponds to the portable telephone in the above-mentioned embodiments and performs transmit-receive of a data packet (a radio protocol packet) in which protocol data (radio protocol data) based on standards of a radio communication is added to user data. The radio communication unit 810 receives with the antenna 811 the radio protocol packet transmitted from a base station 900 through a radio wave and transmits the same to the protocol conversion unit 820, and receives the radio protocol packet transmitted from the protocol conversion unit 820 and transmits the same to the base station 900 through a radio wave.

The protocol conversion unit 820 is one in which the same constitution as the protocol conversion apparatus 600 shown in FIG. 7 is loaded on an LSI, and receives the radio protocol data from the radio communication unit 810 and add the protocol data (USB protocol data) based on USB standards to the radio protocol data so that a data packet (a USB protocol packet) based on USB standards is generated. The data packet thus generated is transferred to the protocol processing unit 830. On the other hand, the protocol conversion unit 820 receives from the protocol processing unit 830 a USB protocol packet in which radio protocol data is added to user data and further USB protocol data is added, and removes USB protocol data from the USB protocol packet to derive the radio protocol packet. The radio protocol packet thus derived is transferred to the radio communication unit 810.

The protocol processing unit 830 has a constitution which is similar to the communication function portion of the personal computer, as shown in FIG. 2. That is, the protocol processing unit 830 comprises: a USB controller 831, as a hardware, for performing transmit-receive of a USB protocol packet between it and the protocol conversion unit 820; a USB driver 832 for providing such a process that USB protocol data is removed from the USB protocol packet transmitted from the protocol conversion unit 820 via the USB controller 831 to derive a radio protocol packet and the derived radio protocol packet is transferred to a communication driver 833, and USB protocol data is added to a radio protocol packet received from the communication driver 833 and then transferred to the USB controller 831 for a communication with the protocol conversion unit 820; and the communication driver 833 for providing such a process that a radio protocol packet is received from the USB driver 832 and radio protocol data is removed from the radio protocol packet to derive user data so that the derived user data is transferred to an application program 841 of the application execution unit 840, and user data is received from the application program 841 of the application execution unit 840 and radio protocol data is added to the received user data to generate a radio protocol packet so that the radio protocol packet thus generated is transferred to the USB driver 832.

The application execution unit 840 executes the application program 841.

That is, the communication apparatus 800 has a form in which the protocol conversion apparatus 600 and the portable telephone 300, which are shown in FIG. 1, are incorporated into the personal computer 100. In this case, unification of functions is performed, for example, in such a manner that the keyboard 103 instead of the push buttons of the portable telephone 300 is used.

Alternatively, it is acceptable that the communication apparatus 800 is one in which the function of the protocol conversion apparatus 600 is incorporated into a mobile equipment, and of the constitution elements of the personal computer 100, elements necessary for the mobile equipment are incorporated.

FIG. 21 is a view showing a modification of the communication apparatus shown in FIG. 20. There will be described differences from the communication apparatus shown in FIG. 20.

The communication apparatus 800 shown in FIG. 21 is constructed in such a manner that a USB protocol packet is transferred directly between the protocol conversion unit 820 (a construction portion corresponding to the USB unit transmit-receive driver 611 when the protocol conversion unit 820 is divided in internal construction as in the protocol conversion apparatus 600 shown in FIG. 7) and the USB driver 832 of the protocol processing unit 830.

The protocol processing unit 830, which constitutes the communication apparatus 800 shown in FIG. 20, is provided with the USB controller 831 as the hardware, and is constructed in such a manner that the communication with the protocol conversion unit 820 is performed via the USB controller 831. It is noted, however, that the USB controller 831 is needed in the event that the protocol processing unit 830 (a personal computer) and the protocol conversion unit 820 (a protocol conversion apparatus) are constructed individually, but in the event that the protocol processing unit 830 and the protocol conversion unit 820 are constructed in a unitary body, the USB controller is not always needed, as shown in FIG. 21.

As mentioned above, according to the present invention, it is possible to implement a protocol conversion apparatus capable of contributing to miniaturization and cost-down of the apparatus; a communication apparatus suitable for the protocol conversion apparatus or a communication apparatus having a function of the protocol conversion apparatus; and a communication system comprising the communication apparatus.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A protocol conversion apparatus, comprising:
a first transmit-receive driver for transmitting and receiving a data packet based on a first communication standard, wherein protocol data based on the first communication standard is added to user data;
a second transmit-receive driver for transmitting and receiving a data packet based on a second communication standard, wherein protocol data based on the second communication standard is added to user data; and
a protocol assembling and removing unit for providing such a process that the data packet based on the first communication standard is received by said first transmit-receive driver and the protocol data based on the second communication standard is added to the received data packet based on the first communication standard without removing the protocol data based on the first communication standard to generate the data packet based on the second communication standard where the generated data packet is transferred to said second transmit-receive driver for transmit-receive from said second transmit-receive driver, and
wherein the data packet based on the second communication standard is received by said second transmit-receive driver and includes the protocol data based on the first communication standard added to the user data in addition to the protocol data based on the second communication standard, the protocol data based on the second communication standard is removed from the received data packet to derive the data packet based on the first communication standard having the protocol data based on the first communication standard added to the user data, and the derived data packet is transferred to said first transmit-receive driver for transmit-receive from said first transmit-receive driver,
a standard setting unit is provided for setting up a type of communication standard selected from among a plurality of types of communication standards,
said first transmit-receive driver transmits and receives the data packet based on the first communication standard, wherein the protocol data based on the first communication standard, which is set up by said standard setting unit, is added to the user data, and
said standard setting unit has a register for storing set up standard data indicative of a communication standard to be set up, and the data packet, which is received by said second transmit-receive driver, wherein the protocol data based on the second communication standard is added to the set up standard data, is received and the set up standard data is derived from the received data packet so as to be set up onto said register.

2. A protocol conversion apparatus, comprising:
a first transmit-receive driver for transmitting and receiving a data packet based on a first communication standard, wherein protocol data based on the first communication standard is added to user data;
a second transmit-receive driver for transmitting and receiving a data packet based on a second communication standard, wherein protocol data based on the second communication standard is added to user data; and
a protocol assembling and removing unit for providing such a process that the data packet based on the first communication standard is received by said first transmit-receive driver and the protocol data based on the second communication standard is added to the received data packet based on the first communication standard without removing the protocol data based on the first communication standard to generate the data packet based on the second communication standard where the generated data packet is transferred to said second transmit-receive driver for transmit-receive from said second transmit-receive driver,
wherein the data packet based on the second communication standard is received by said second transmit-receive driver and includes the protocol data based on the first communication standard added to the user data in addition to the protocol data based on the second communication standard, the protocol data based on the second communication standard is removed from the received data packet to derive the data packet based on the first communication standard having the protocol data based on the first communication standard added to the user data, and the derived data packet is transferred to said first transmit-receive driver for transmit-receive from said first transmit-receive driver, and
said protocol assembling and removing unit provides such a process that in a case where the data packet received by said first transmit-receive driver exceeds a predetermined length, the data packet is divided into a plurality of sections to generate the data packet based on the second communication standard on each segment, and the data packet based on the first communication standard is reproduced from a plurality of data packets, which are received by said second transmit-receive driver, wherein respective segments in which the data packet based on the first communication standard is divided into a plurality of portions are given in form of user data.

3. A communication apparatus for performing a communication with an exterior, comprising:
first driver means for providing such a process that user data is received and protocol data based on a first communication standard is added to the received user data to generate a data packet based on the first communication standard, and a data packet, in which protocol data based on the first communication standard is added to user data, is received and the protocol data is removed from the received data packet to derive the user data;
second driver means for providing such a process that the data packet based on a first communication standard, which is generated by said first driver means, is received and in addition protocol data based on a second communication standard is added to the received data packet to generate a data packet based on the second communication standard, and a data packet based on the second communication standard, in which protocol data based on the second communication standard is added to a data packet based on the first communication standard in which data based on the first communication standard is added to user data, is received and the protocol data based on the second communication standard is removed from the received data packet to derive the data packet based on the first communication standard and then the derived data packet is transferred to said first driver means; and a communication unit for providing such a process that the data packet based on the second communication standard is received from said second driver means and the received data packet is transmitted to an exterior, and the data packet based on the second communication standard is received from the exterior and the received data packet is transmitted to said second driver means, and wherein as said first driver means, there is provided a plurality of types of first driver means each associated with the first communication standard from among a plurality of types of communication standards, and said communication apparatus further comprises standard setting means for activating a first driver means according to the set up standard data indicative of a type of communication standard selected from among the plurality of types of communication standards, of said plurality of types of first driver means, received from the exterior.

4. A communication apparatus for performing a communication with an exterior, comprising:

first driver means for providing such a process that user data is received and protocol data based on a first communication standard is added to the received user data to generate a data packet based on the first communication standard, and a data packet, in which protocol data based on the first communication standard is added to user data, is received and the protocol data is removed from the received data packet to derive the user data;

second driver means for providing such a process that the data packet based on a first communication standard, which is generated by said first driver means, is received and in addition protocol data based on a second communication standard is added to the received data packet to generate a data packet based on the second communication standard, and a data packet based on the second communication standard, in which protocol data based on the second communication standard is added to a data packet based on the first communication standard in which data based on the first communication standard is added to user data, is received and the protocol data based on the second communication standard is removed from the received data packet to derive the data packet based on the first communication standard and then the derived data packet is transferred to said first driver means; and a communication unit for providing such a process that the data packet based on the second communication standard is received from said second driver means and the received data packet is transmitted to an exterior and the data packet based on the second communication standard is received from the exterior and the received data packet is transmitted to said second driver means, and wherein said second drive means provides such a process that in a case where the data packet based on said first communication standard, which is received from said first driver means, exceeds a predetermined length, the data packet is divided into a plurality of sections to generate the data packet based on the second communication standard on each segment and the generated data packet is transferred to said communication unit, and the data packet based on the first communication standard is reproduced from a plurality of data packets, which are received from said communication unit, wherein respective segments in which the data packet based on the first communication standard is divided into a plurality of portions are given in form of user data, and the reproduced data packet is transferred to said first driver means.

5. A communication system, comprising:

a protocol conversion apparatus comprising:

a first transmit-receive driver for transmitting and receiving a data packet based on a first communication standard, wherein protocol data based on the first communication standard is added to user data;

a second transmit-receive driver for transmitting and receiving a data packet based on a second communication standard, wherein protocol data based on the second communication standard is added to user data; and a protocol assembling and removing unit for providing such a process that the data packet based on the first communication standard is received by said first transmit-receive driver, the protocol data based on the second communication standard is added to the received data packet based on the first communication standard without removing the protocol data based on the first communication standard to generate the data packet based on the second communication standard, the generated data packet is transferred to said second transmit-receive driver for transmit-receive from said second transmit-receive driver, the data packet based on the second communication standard received by said second transmit-receive driver and having the protocol data based on the first communication standard added to the user data in addition to the protocol data based on the second communication standard is received, and the protocol data based on the second communication standard is removed from the received data packet to derive the data packet based on the first communication standard, wherein the protocol data based on the first communication standard is added to the user data, and the derived data packet is transferred to said first transmit-receive driver for transmit-receive from said first transmit-receive driver; and a communication apparatus for performing a communication with an exterior, comprising:

first driver means for providing such a process that user data is received and protocol data based on a first communication standard is added to the received user data to generate a data packet based on the first communication standard, and a data packet in which protocol data based on the first communication standard is added to user data is received, and the protocol data is removed from the received data packet to derive the user data;

second driver means for providing such a process that the data packet based on the first communication standard generated by said first driver means is received, protocol data based on a second communication standard is added to the received data packet based on the first communication data to generate a data packet based on the second communication standard, a data packet based on the second communication standard having protocol data based on the second communication standard added and a data packet based on the first communication standard in which data based on the first communication standard is added to user data, is received and the protocol data based on the second communication standard is removed from the received data packet to derive the data packet based on the first communication standard and transferred to said first driver means; and a communication unit for providing such a process that the data packet based on the second communication standard is received from said second driver means and the received data packet is transmitted to an exterior, and the data packet based on the second communication standard is received from the exterior and the received data packet is transmitted to said second driver means.

6. A protocol conversion apparatus, comprising:

first transmit-receive and second transmit-receive drivers for transmitting and receiving a data packet based on a first communication standard and a second communication standard, respectively;

a protocol assembling and removing unit, wherein user data is combined to the first communication standard to generate a data packet based on the first communication standard, and a protocol data based on the second communication standard is added to the data packet based on the first communication standard without removing the first communication standard to generate the data packet based on the second communication standard, and upon receipt of the generated packet, the second communication standard is removed from the received data packet to derive the data packet based on the first communication standard; and a standard setting unit for setting up a type of communication standard, wherein the standard setting unit sets up a communication standard in accordance with a signal set by the protocol conversion apparatus, and the second transmit-receive driver transmits a data packet in which the protocol data based on the second communication standard is added to the set up standard data indicative of the communication standard set by the standard setting unit.

\* \* \* \* \*